*INVENTOR.*
WILLIAM B. ZELINA
BY
HIS ATTORNEY

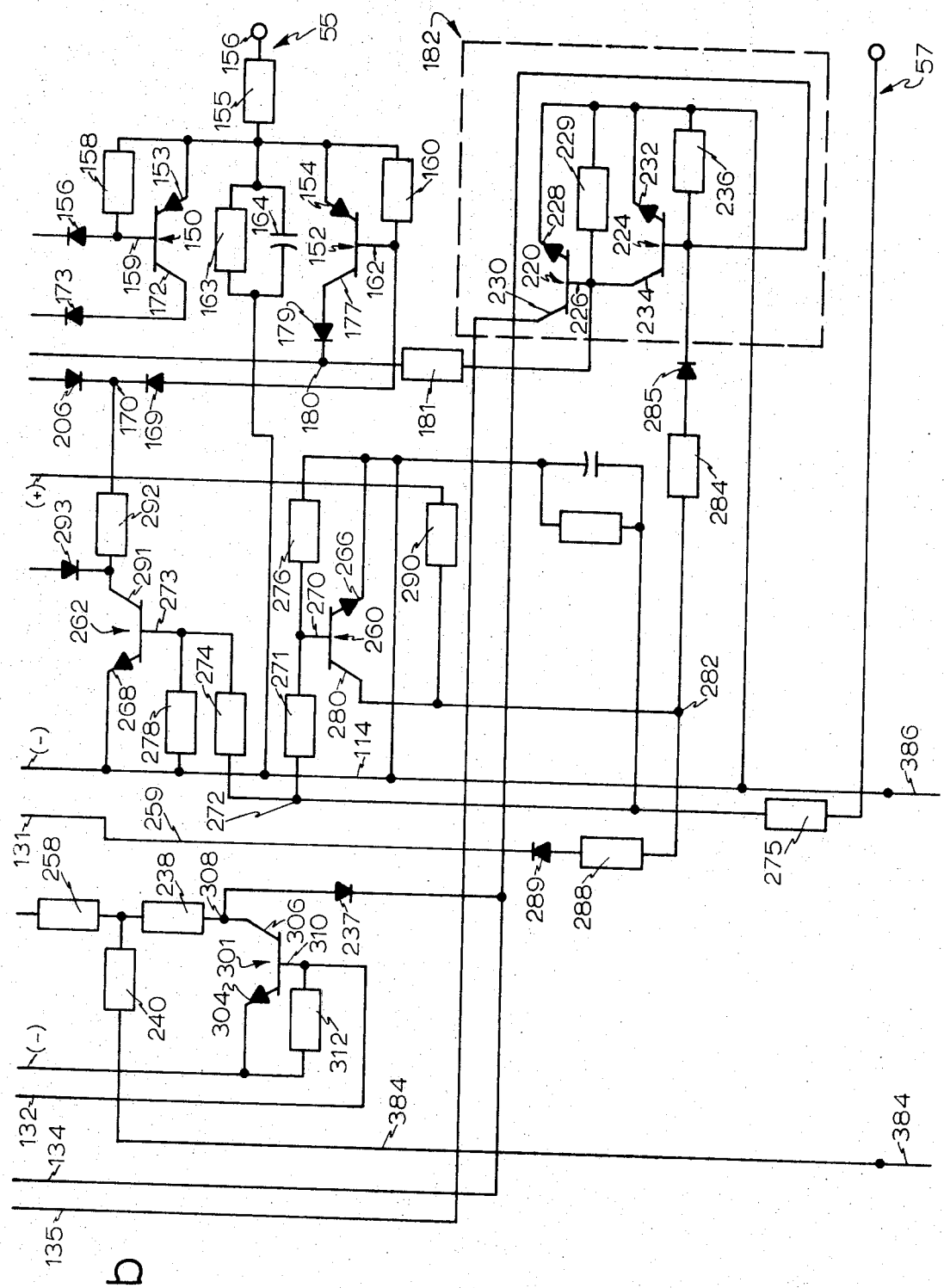

United States Patent Office 3,564,365
Patented Feb. 16, 1971

3,564,365
STATIC REGENERATIVE CONTROL OF DIRECT CURRENT MOTORS FROM AN A.C. SOURCE
William B. Zelina, Edinboro, Pa., assignor to General Systems, Inc., Erie, Pa., a corporation of Pennsylvania
Filed June 30, 1969, Ser. No. 837,756
Int. Cl. H02p *3/14*
U.S. Cl. 318—251                                            25 Claims

ABSTRACT OF THE DISCLOSURE

A static full reversing, regenerative control system for controlling the operation of series direct current motors in both motoring and regenerative braking conditions wherein a single controlled rectifier bridge rectifier is employed and controlled to operate as an inverter during regeneration so that the torque of the motor may be continuously controlled from a maximum positive value to a maximum negative value. Smooth, controllable transition is provided between motoring and regenerative braking operating conditions by a static reversible field switching means and maintenance of the direction of current in the motor armature circuit with provision for limiting the motor current, motor voltage and both positive and negative rate-of-change of motor current.

---

This invention relates generally to the control of electric power transmitted between direct current and alternating current systems. More particularly the invention relates to electric motor control systems for controlling the operation of direct current series motors supplied from an alternating current power source and providing for smooth controllable transition from motoring torque to braking torque.

While the invention has a wide range of application it is especially suited for use in traction applications, such as in controlling the electric propulsion system of vehicles, such as locomotives, rapid transit cars, off-highway vehicles, and the like, adapted to employ direct current series motors supplied from an alternating current source, and the invention, therefore, will be particularly described in that connection.

It is to be understood that the alternating current source may be external of the vehicle and may be provided, for example, by a commercial power system, or the source may be internal and be provided by a vehicle-borne alternator driven by any suitable prime mover, such as a diesel engine.

The control system of the present invention uses a controlled rectifier power conversion bridge rectifier apparatus to regulate the power supplied from an alternating current source to direct current series motors in combination with a controlled rectifier field switching arrangement to effect reversible control of the motor field circuit to provide for smooth, controllable transition from motoring torque to braking torque and vice versa. Suitable voltage and current limiting means, as well as both positive and negative rate-of-change of current limiting means, are also provided to prevent excessive motor currents or voltages during operation and to allow for the initiation of regenerative braking without excessive motor current.

There are a great many motor control system applications, and especially direct current series motor traction applications, where it is not only desirable but often necessary to be able to "regenerate" in order to rapidly and permanently brake the motor to either bring the vehicle to a desired rapid stop or to reverse its direction.

"Regeneration" may be very simply stated as being that condition of drive operation in which the driven load actually drives the motor as a generator, causing normal power flow to be reversed. Under such conditions the motor "pumps back" power to the source and applies braking torque to the load.

The advantages of regenerative braking over such other well known methods as "mechanical friction braking," "dynamic braking" or "motor plugging" are many and well known so that regenerative braking has long been considered to be the most desirable method of braking direct current motors. In spite of this, and the fact that static regenerative motor control systems have been provided for controlling direct current shunt motors from an alternating current source, to my knowledge, no satisfactory static regenerative motor control system has heretofore been provided for direct current series motor traction application.

Among the problems in a regenerative motor control system for a direct current series motor is the stability and difficulty in controlling the machine, which during regeneration becomes a direct current series generator. In addition, at the instant it is desired to initiate regenerative braking operation the machine voltage is zero and no current is flowing in the series field. Accordingly, machine current must be restarted in a direction for regeneration and it must ordinarily be started at a level which, once started, tends to suddenly attain an excessive level.

In accordance with a feature of this invention this difficulty is obviated by continuously regulating both the rate-of-change of current and the maximum value of such current thereby allowing current to be restarted in the series field winding in a direction for regeneration while preventing such current from ever becoming uncontrollable due to its sudden rise to an excessive value.

Some known prior art static regenerative motor controls for controlling direct current shunt motors from an A-C source employ reversible rectification. That is, the use of two separate controlled rectifier bridge rectifier equipments arranged in the so-called anti-parallel connection. While such reversible rectification is a functionally satisfactory arrangement it requires duplication of controlled rectifier power conversion equipment. Moreover, in the anti-parallel connection line-to-line shorts are possible which is not so in the case of unidirectional rectification. For these reasons alone control systems employing reversible field control and unidirectional rectification are becoming more and more attractive.

Although there are many reasons why alternating current is used as the input power to direct current motors, it is particularly advantageous for direct current motor control systems incorporating regenerative braking. This is because a voltage of either polarity may be readily supplied to the direct current motor by connecting the continually reversing polarity A.C. supply to the direct current machine at the proper time. This feature is utilized in the control system of the present invention and, during motoring operation, rectified alternating current power of one polarity is supplied to the direct current motor while during regeneration, or regenerative braking operation, the motor field is reversed, reversing the motor flux and the polarity of the counter EMF, so that the machine becomes a series generator with rectified alternating current power of the opposite polarity, compatible with regeneration, being supplied thereto.

It is an object of this invention to provide a static system for controlling the operating condition (speed, torque or the like) and direction of rotation of direct current series motors supplied from an alternating current source and with smooth, controllable transition between motoring torque and regenerative braking torque.

Another object of the invention is to provide a static system for regulating the operation of direct current series motors supplied from an alternating current source and wherein smooth, controllable transition between motoring torque and regenerative braking torque is achieved by application of a unidirectional rectified voltage to the motor and controlled rectifier reversible control of the motor field circuit.

Still another object of the invention is the provision of a static control system for controlling a series direct current machine connected with an alternating current source for operation either as a series motor or a series generator.

In carrying the invention into effect in one form thereof, a single controlled rectifier bridge rectifier equipment is provided for supplying current to the series connected motor field and armature circuits of a direct current series motor from an alternating current power source. Regulating means are provided for controlling the output of the bridge rectifier to regulate operation of the motor within preselected motor armature current and voltage limits, as well as providing for preselected limits on both the positive and negative rate-of-change of motor current. Means are provided for producing error signals which bear a relationship to a desired operating condition of the motor, as for example, motor armature current, motor armature voltage, positive rate-of-change of motor current, and negative rate-of-change of armature current, and to which error signals the regulating means is responsive to control the output of the bridge rectifier in accordance therewith. A controlled rectifier field switching circuit is provided with which the motor series field winding is adapted to be connected. The field switching circuit is adapted to be controlled by a logic circuit means, which allows for a desired motor operating condition to be established if the control system is capable of operation in that condition. The field switching circuit is selectively controllable between a first condition for supplying current in one direction in the motor field winding to cause the motor to produce a positive or "motoring" torque, and a second condition for supplying current in the reverse direction in the motor field winding to cause the motor to produce a negative or "braking" torque.

The control system may also include means responsive to system fault condition signals for shorting the motor field and removing power from the motor. With such a short the field is "killed" and the motor voltage reduced practically to zero very rapidly thereby removing any danger of damage to the motor or the control system because of the fault condition. Timing means may be further provided for operation in combination with the foregoing means for removing the field short and reapplying power to the motor after a predetermined time but only for a predetermined maximum number of times if the fault condition signals continue to be applied. Accordingly, the control system and the motor will be prevented from damage even transient or spurious fault conditions and be shut down only when a sustained fault condition exists.

During regenerative braking operation a runaway condition could exist if the A-C supply voltage were to fall below the regeneration voltage. That is a runaway condition could exist if the A-C supply voltage becomes lower than the voltage produced by the machine operating as a generator. Accordingly, to overcome any such problems the system may also be provided with means to limit the maximum regeneration voltage to a value lower than the lowest value reasonably expected to be exhibited by the A-C power source. Since it would usually not be desirable to similarly limit the motor voltage to this lower value during motoring operation, one voltage limit reference voltage signal source may be provided which is utilized during regeneration and another voltage limit reference voltage signal source may be provided to be utilized during motoring.

For the purpose of forcing the rapid collapse of the motor field in a manner which will not result in excessive induced voltages, one rate-of-change of current reference signal source may be provided to allow for a maximum rate-of-change of current during field collapse, with a lower rate-of-change of current reference signal source being provided to provide for the desired rate-of-change of current during operation in motoring or regenerative braking.

The novel features believed characteristic of the invention are set forth with particularity in the appended claims. The invention itself, however, together with its organization and mode of operation, as well as other objects and advantages thereof, may best be understood by reference to the following description taken in conjunction with the accompanying drawings in which:

Figure 1:
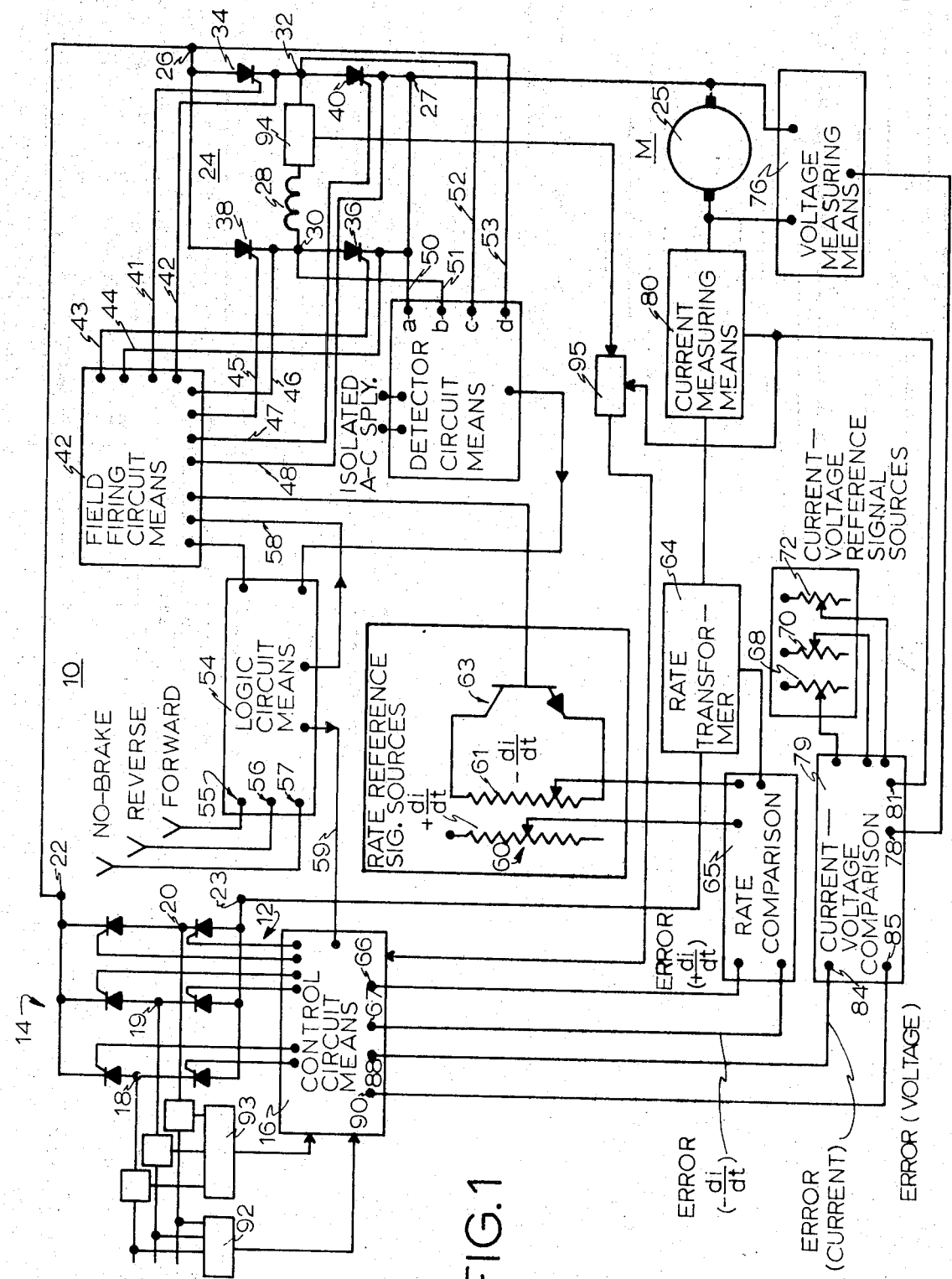
FIG. 1 is a schematic block diagram of a control system in accordance with one embodiment of the invention.
Figure 5A:
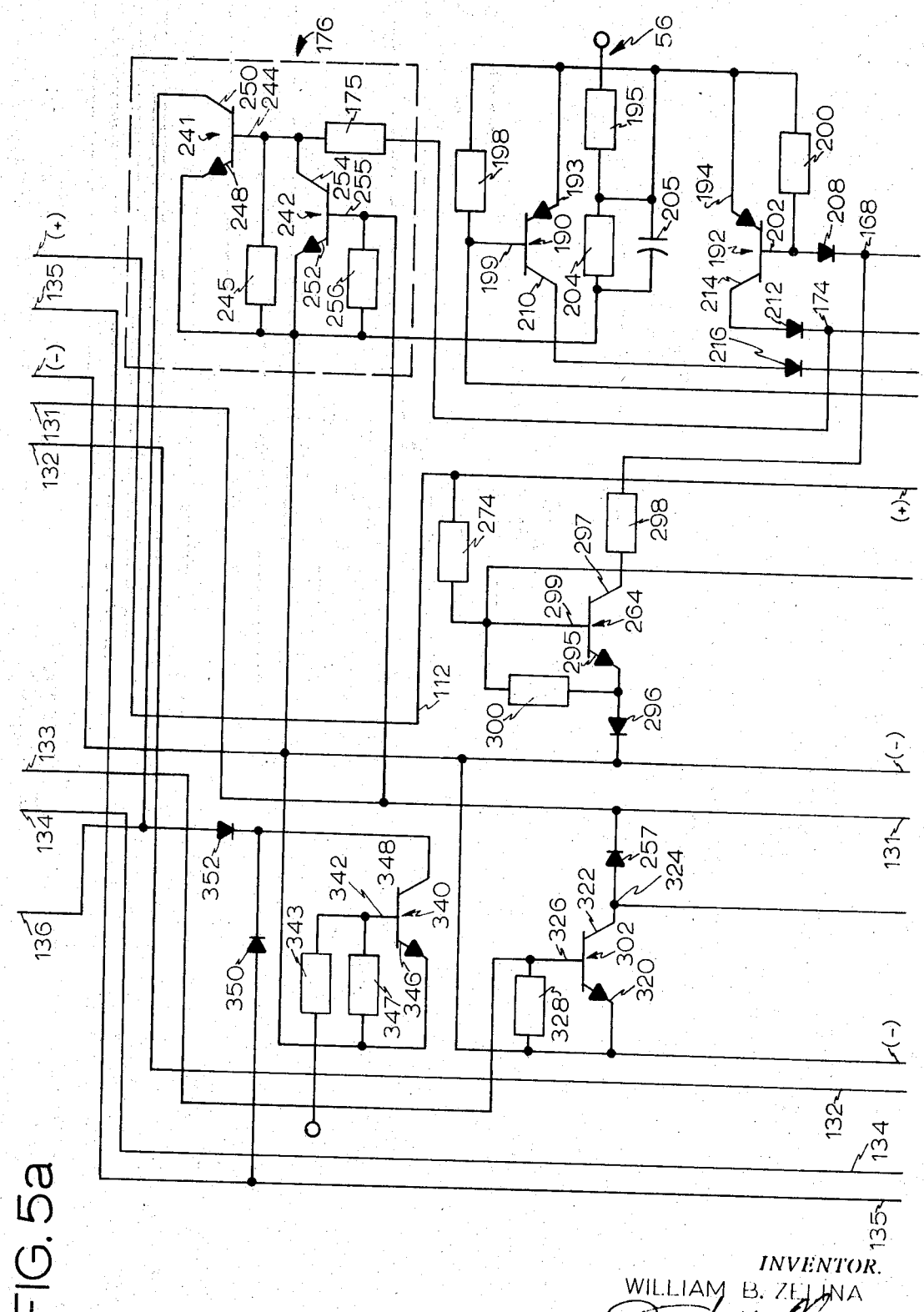
Figure 6:
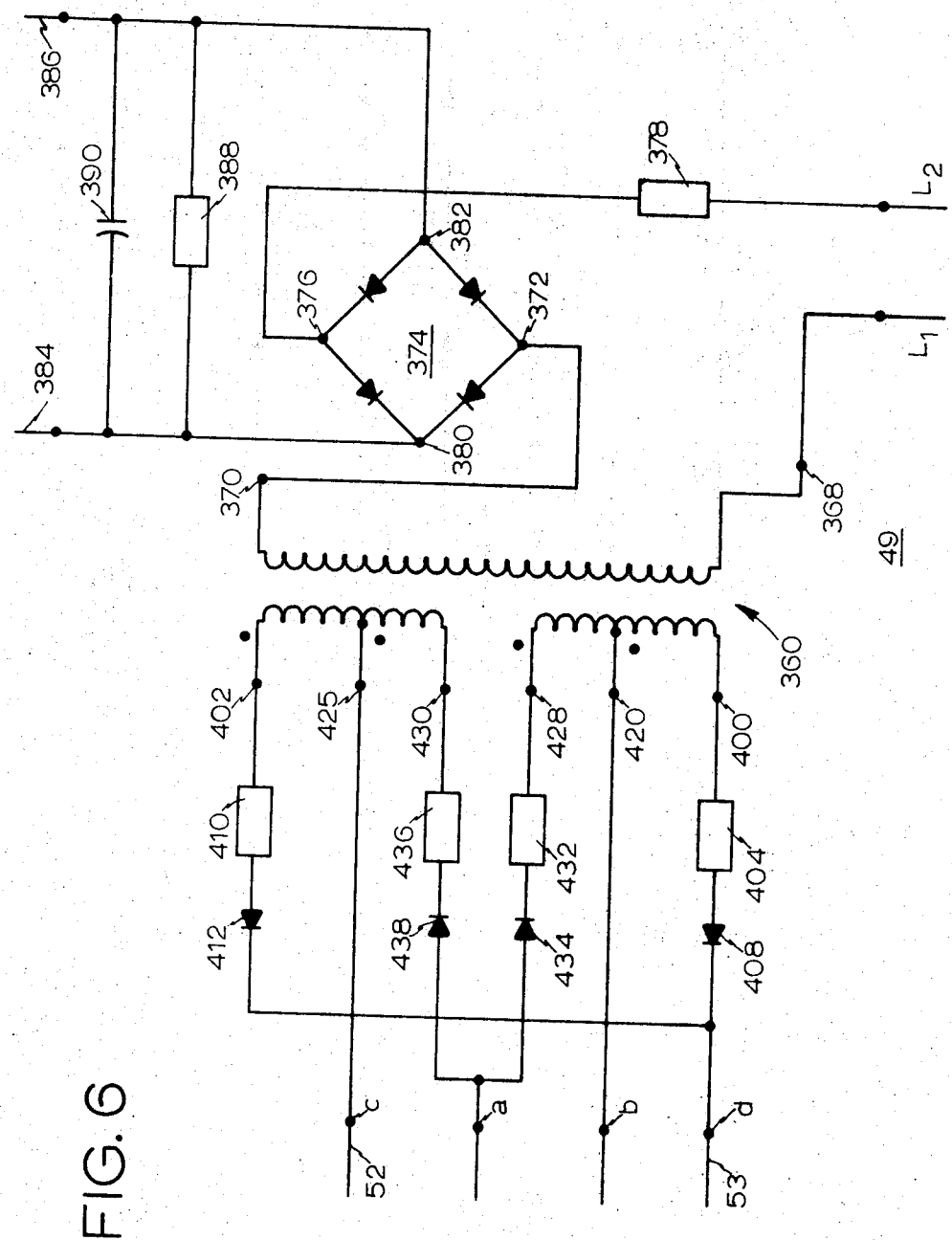
Figure 7:
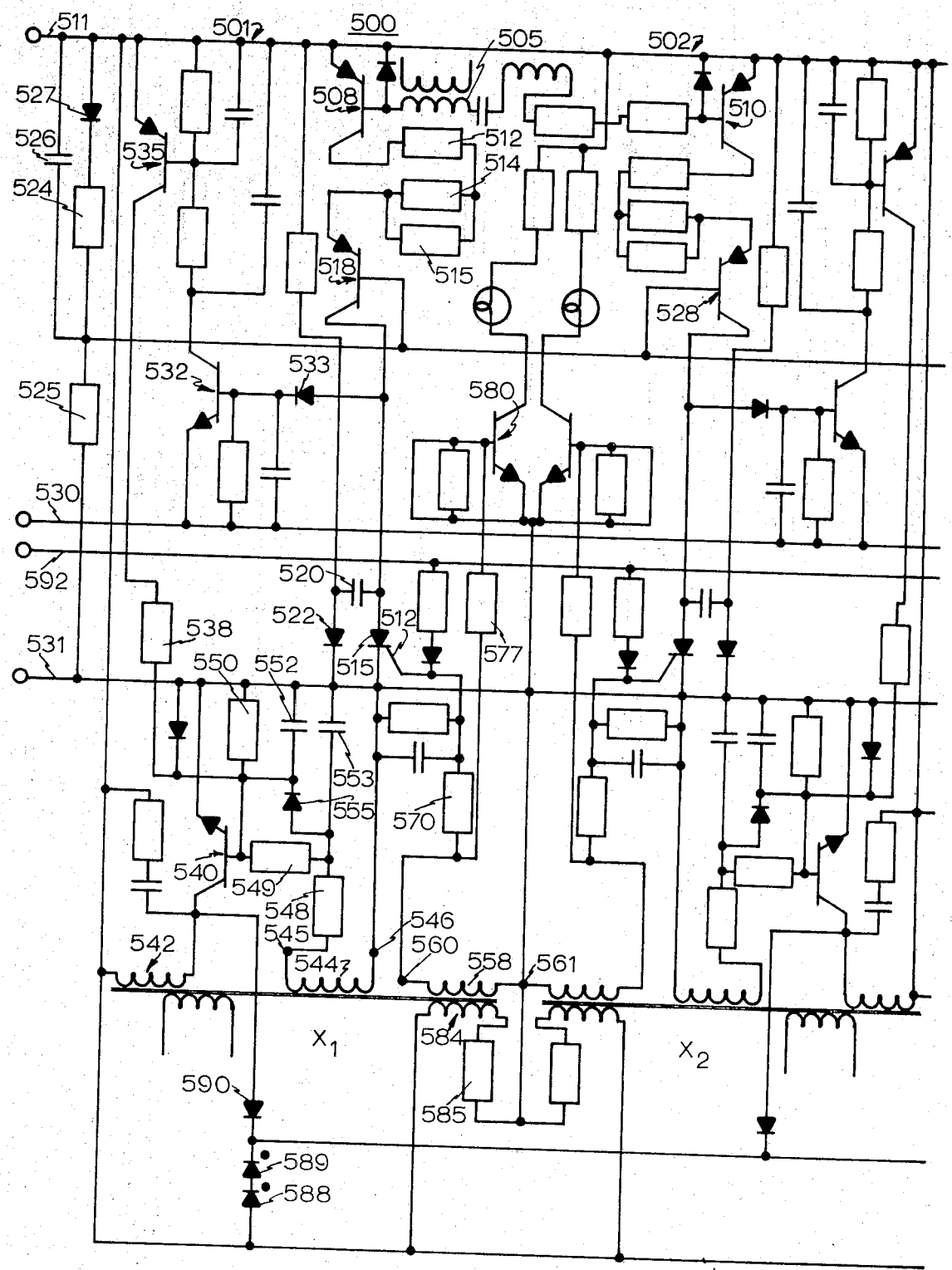
Figure 7A:
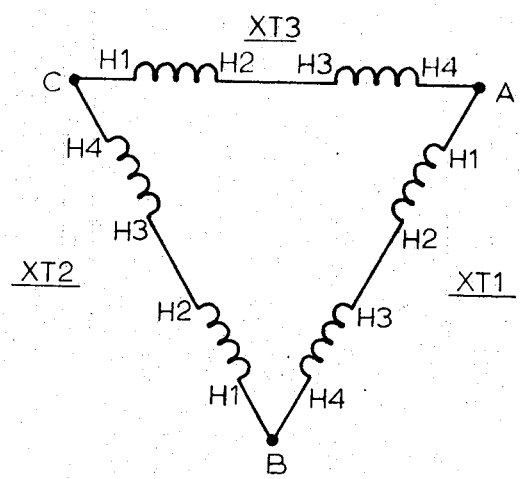

FIGS. 5a and 5b make up a schematic circuit diagram of an arrangement suitable for use in providing for the necessary logic functions of logic circuit 54 of FIG. 1 so that the desired operating condition will be established if the system is capable of operation in the condition;

FIG. 6 is a schematic circuit diagram of an arrangement for detecting when all controlled rectifiers of the field circuit means 49 of FIG. 1 are in a forward blocking state;

FIG. 7 is a schematic circuit diagram of a preferred phase-angle firing circuit for use with control circuit means 16;

FIG. 7a shows a modification for FIG. 7.

Figure 8:
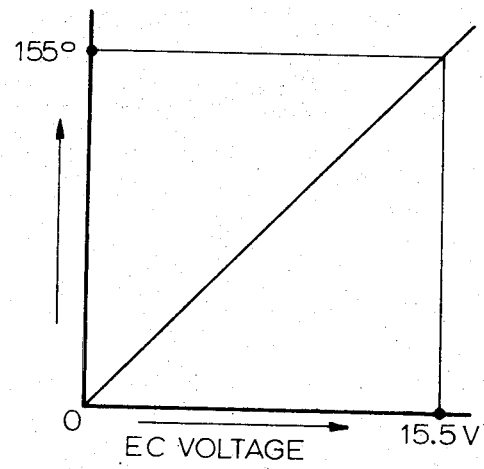
Figure 9:
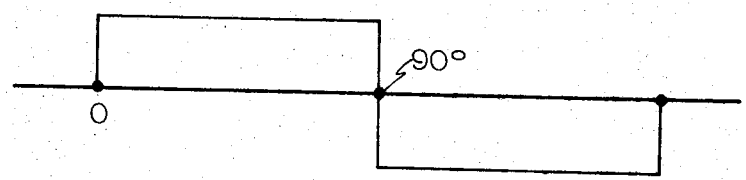
Figure 10:
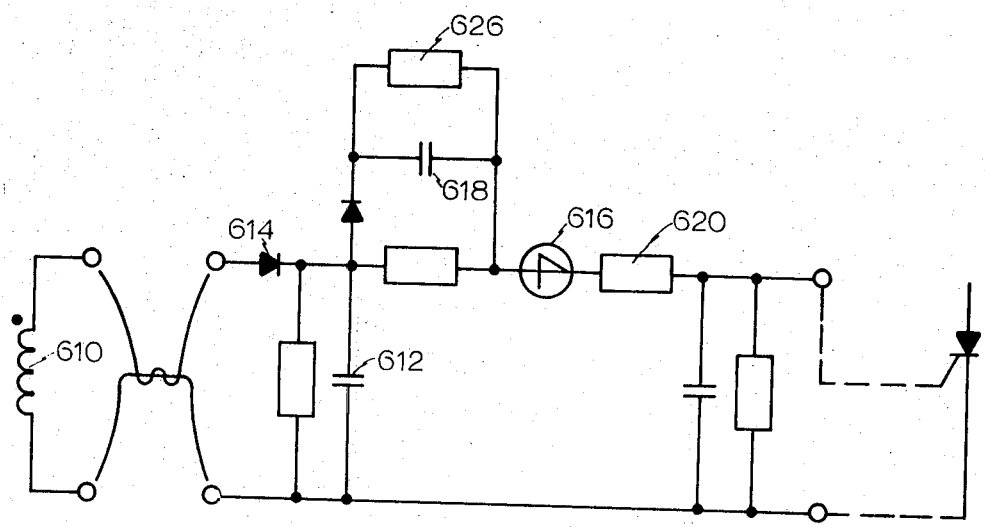
Figure 11:
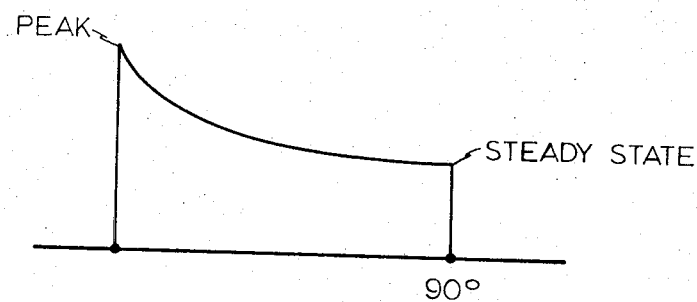
Figure 12A:
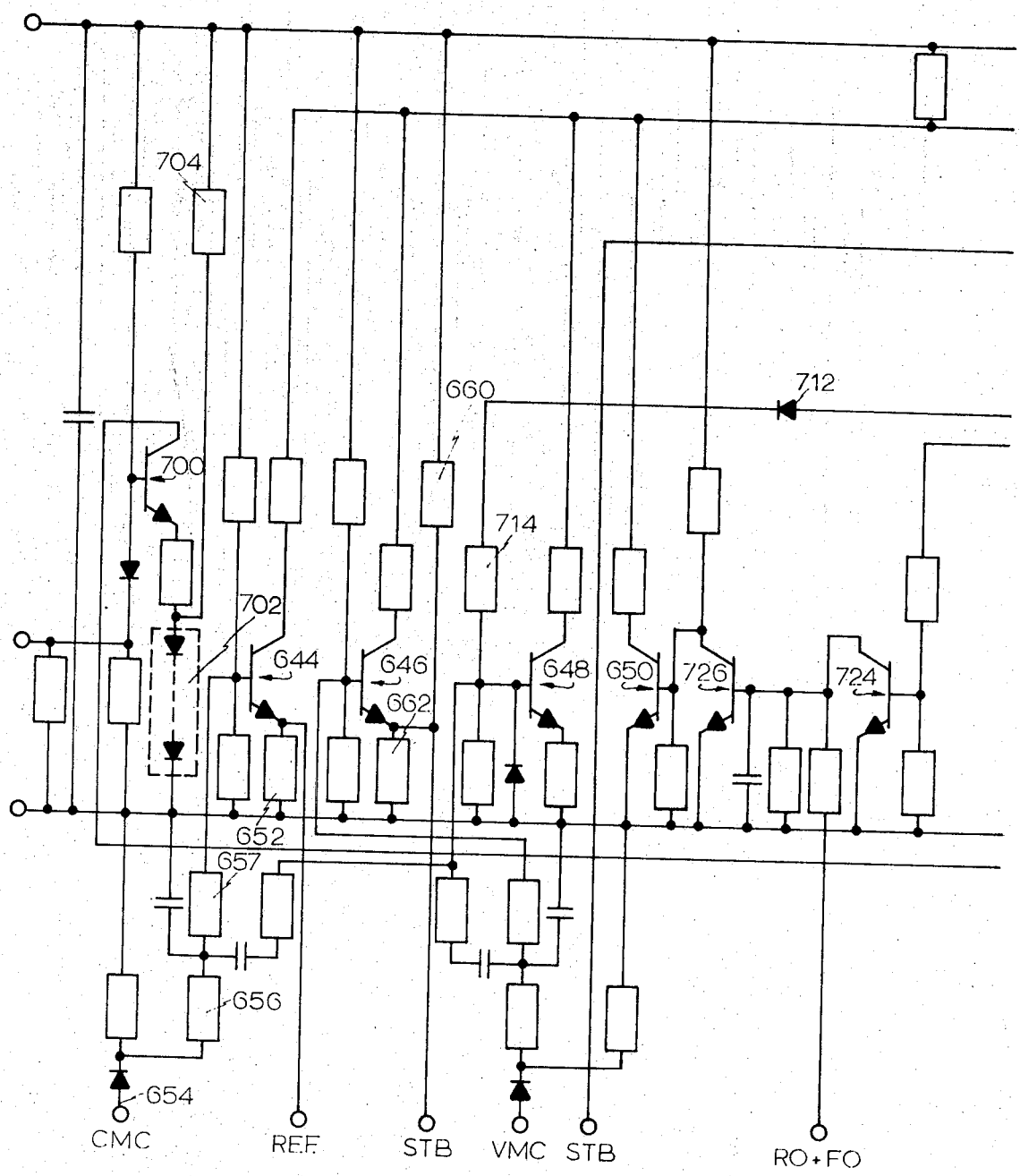
Figure 12B:
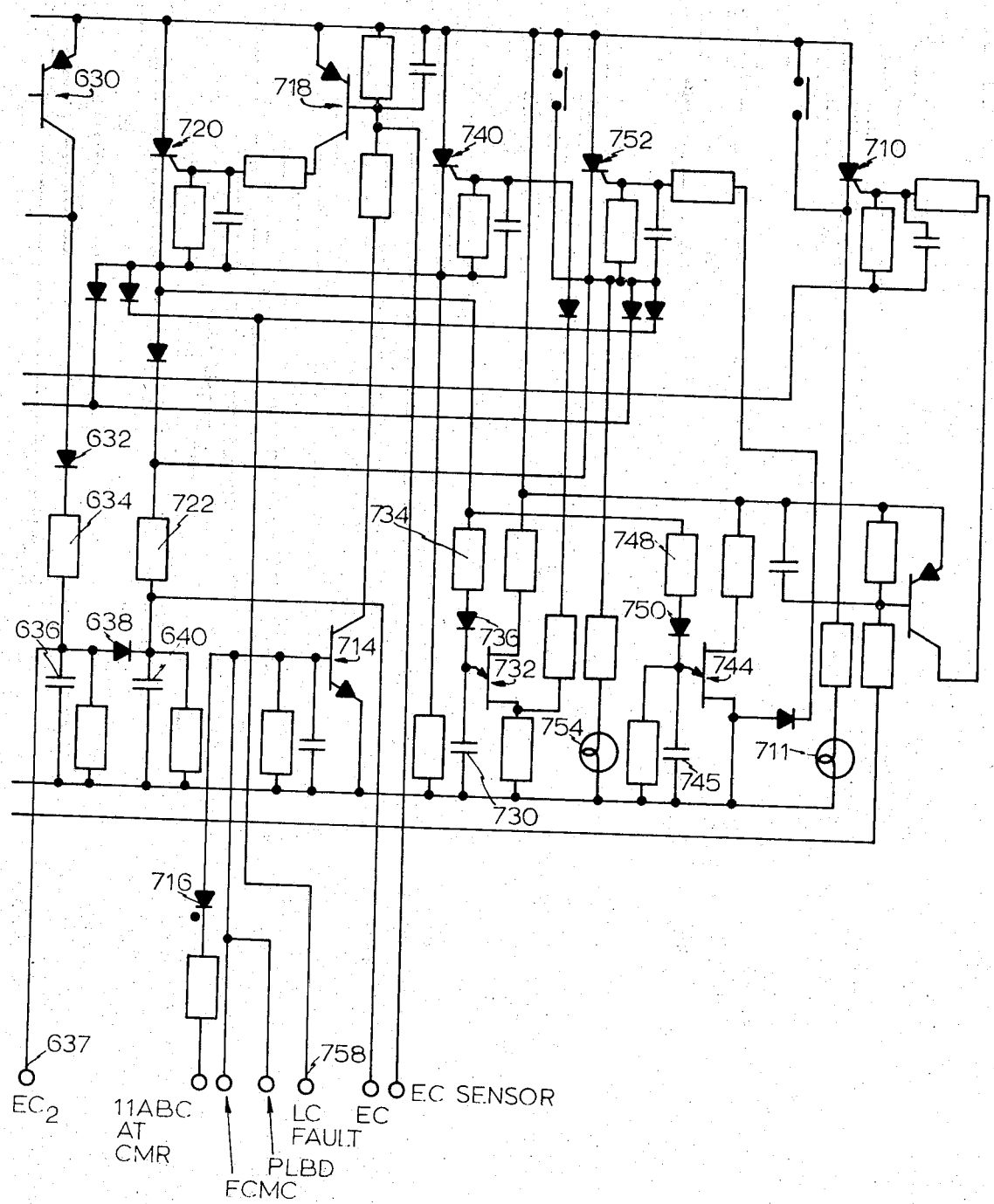
Figure 13:
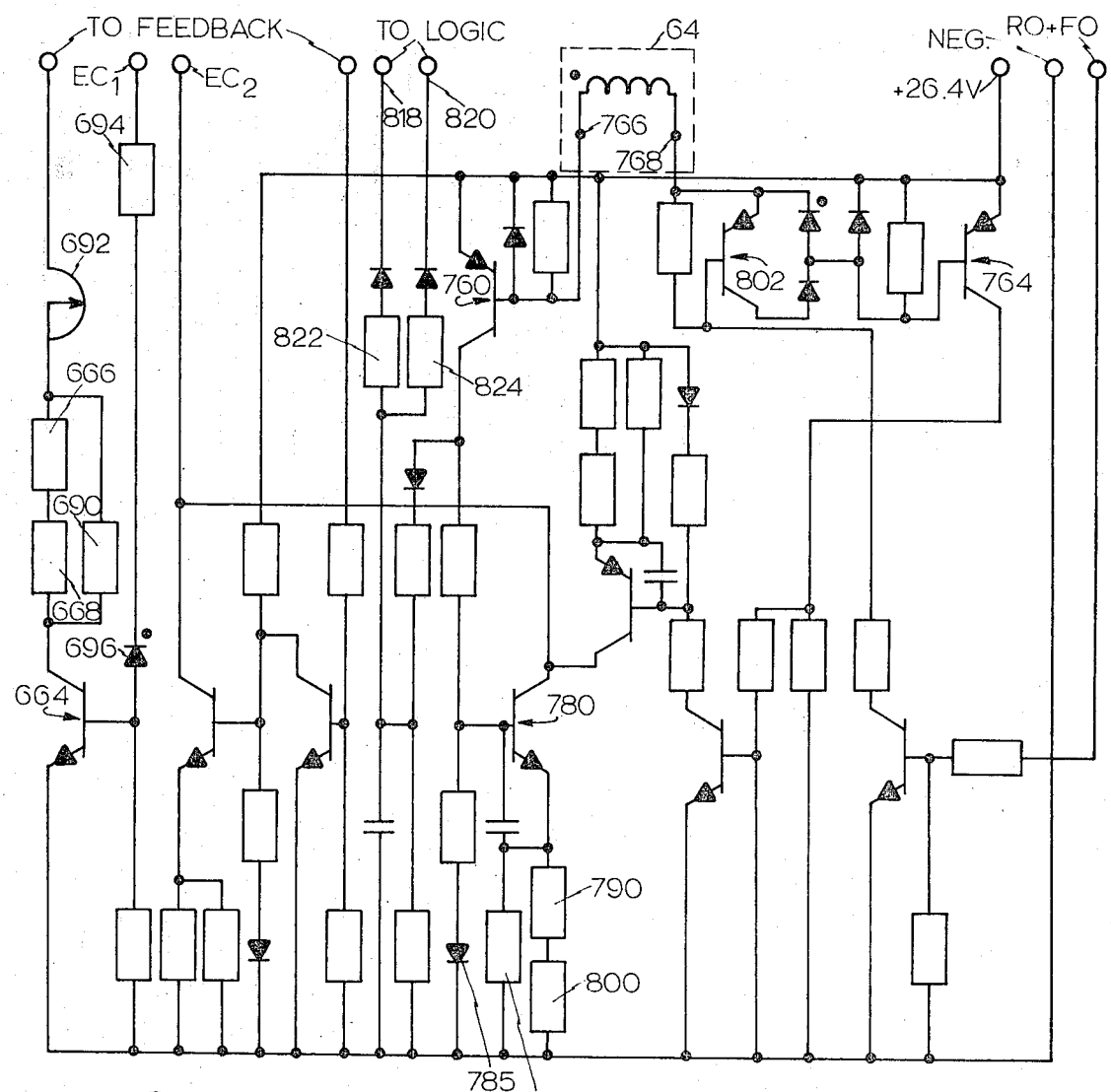

FIG. 8 is a graph showing the transfer characteristic of the firing circuit of FIG. 7 illustrating the firing angle as a function of the feed-back quantity, or error signal, voltage;

FIG. 9 is a wave form of the voltage of output transformers $X_1$ of FIG. 7;

FIG. 10 is a wave form of the firing pulse applied to the controlled rectifiers of the bridge circuit 14;

FIG. 11 is a schematic circuit diagram of a pulse shaping means for producing the firing pulse shown in FIG. 10 from the input voltage shown in FIG. 9;

FIGS. 12a and 12b is a schematic circuit diagram of a feedback circuit arrangement especially advantageous for combination with the firing circuit of FIG. 7; and FIG. 13 is a schematic circuit diagram of a stabilizing network used with the control system of this invention.

Figure 14:
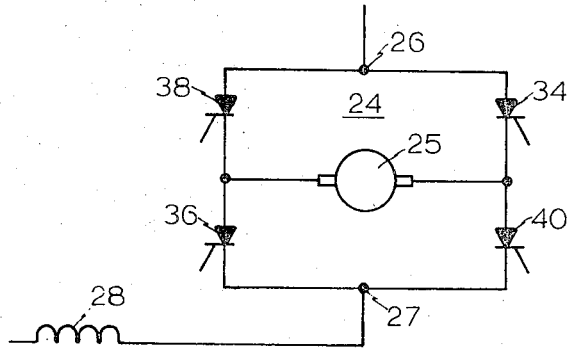

FIG. 14 is a schematic of the motor field circuit.

GENERAL DESCRIPTION

As stated in the foregoing introduction, this invention relates to a control system for controlling a series direct current motor from an alternating current power supply and wherein a single controlled rectifier bridge circuit is employed and controlled to operate as an inverter during regenerative braking so that the torque of the motor may be continuously controlled from a maximum positive value to a maximum negative value. The change in motor operating condition from motoring to regenerative braking is accomplished by reversing the motor field and maintaining the direction of motor armature current with provision for limiting motor current and voltage and both positive and negative rate-of-change of motor current.

Referring now to the drawings, there is shown in FIG. 1 a schematic block diagram of a series direct current motor control system 10 in accordance with one embodiment of the invention. As shown, control system 10 comprises a power conversion means 12, which is preferably of the conventional controlled rectifier type, including a controlled rectifier bridge circuit 14 and a control circuit means 16 therefor. The input terminals 18, 19 and 20 of bridge circuit 14 are connected through power supply lines $L_1$, $L_2$, and $L_3$ with a three-phase alternating current power supply (not shown). The firing of the controlled rectifiers of bridge circuit 14 may be controlled in any suitable manner, preferably by the method of varying the firing point of the controlled rectifier during the time when its anode is biased positive with respect to its cathode.

To this end, control circuit means 16 is adapted to apply phase-shiftable firing pulses to the controlled rectifiers of bridge circuit 14 in a predetermined cyclic order. Also, so that the output of the power conversion means 12 may be fully controlled in accordance with various feed-back signals from the system, control circuit means 16 is provided with a number of controlling input means so that more than one such feed-back signal may influence the net phase-shift of the firing pulses. In the particular arrangement described, the phase of the output of control circuit means 16 is continuously controllable over 155 electrical degrees and is in synchronism with the alternating current input to the bridge circuit 14. Maximum output of one polarity is produced by bridge circuit 14 with a zero degree (0°) phase-shift in the output of control circuit means 16, zero output is produced at 90° and maximum output of the opposite polarity is produced at 155°. The full 180° range cannot be utilized as there must always be sufficient voltage available to provide for line commutation of the controlled rectifiers of the bridge circuit 14. That is, the reversal of the line voltage across a controlled rectifier is employed to return the controlled rectifier to its forward blocking state. Accordingly, for the arrangement shown in FIG. 1, positive output, or motoring operation, is provided in the range from 0° to 90° and negative output, or regenerative braking operation, is provided in the range from 90° to 155°.

The output terminals 22 and 23 of bridge circuit 14 are connected in a series circuit loop with a field circuit means 24 and the armature circuit 25 of a direct current series motor M. One terminal 26 of field circuit means 24 is connected with terminal 22 of bridge circuit 14 and the other terminal 27 is connected with the motor armature circuit 25. The field winding 28 of motor M is connected across the terminals 30 and 32 of field circuit means 26. The smooth, controllable transition from motor torque to braking torque in the motor M is provided by operation of field circuit means 26 in reversing the motor field and controlling the output of the bridge circuit 14.

To this end, field circuit means 26 comprises four controlled rectifiers 34, 36, 38 and 40 connected in a bridge configuration and being selectively controllable in pairs to provide for opposite directions of current flow in the motor field winding 28. As shown, controlled rectifiers 34 and 36 are arranged in one pair and controlled rectifiers 38 and 40 are arranged in the other pair. The pairs of controlled rectifiers 34–36 and 38–40 are arranged to be selectively rendered conducting by suitable firing signals applied to their control electrodes from a firing circuit means 42. Field controlled rectifier 34 receives firing signals over conductors 41 and 42 while controlled rectifier 36 receives firing signals over conductors 43 and 44. Similarly, controlled rectifier 38 receives firing signals over conductors 45 and 46 and controlled rectifier 40 receives firing signal over conductors 47 and 48. For one operating condition controlled rectifiers 34 and 36 are made conductive thereby establishing current flow in the motor field winding in one direction; the reverse direction of current flow in the motor field winding then being established when controlled rectifiers 38 and 40 are made conductive. For convenence, controlled rectifiers 34 and 36 may sometimes be termed the "foward pair" while controlled rectifiers 38 and 40 may be termed the "reverse pair."

Figure 2:
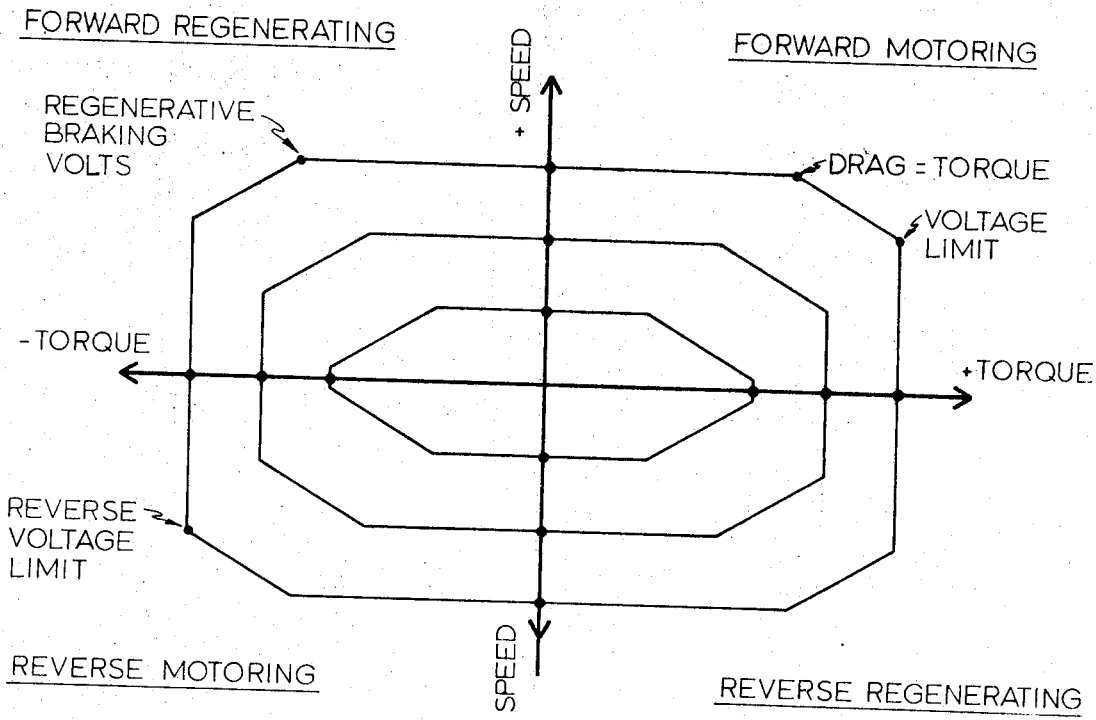
FIG. 2 is a graph showing the relationships between motor speed and torque for various motor armature voltages with armature current always in the same direction and illustrating operation in all four quadrants.

The control system 10 of FIG. 1 provides for full four quadrant operation and has application for vehicle drives and a wide range of other applications such as those with overhauling loads or those requiring the best contactorless reversing drive and/or full regenerative braking. This operation in any of the four operating quadrants is illustrated in FIG. 2 which is a graph showing the relationships between motor speed and torque for various motor armature currents with the armature current always in the same direction. For example, forward motoring or reverse regenerative braking is established when controlled rectifiers 34 and 36 are made to be the conducting pair. Similarly, reverse motoring or forward regenerative braking is established when controlled rectifiers 38 and 40 are made the conducting pair. On the other hand, all the controlled rectifiers, or even one controlled rectifier of each pair, in a conducting state at the same time would be a fault condition.

To preclude the possibility of operation of control system 10 with any such fault, there is provided a detector means 49 which detects the operating condition of the controlled rectifiers 34, 36, 38, and 40 produces a signal voltage whenever any of such controlled rectifiers are in a conducting state. Terminal A of detector means 49 is connected over conductor 50 to terminal 27, terminal B is connetced over conductor 51 with terminal 30, terminal C is connected over conductor 52 with terminal 32, and terminal D is connetced over conductor 53 with terminal 26. Briefly, in the preferred detector arrangement shown in detail in FIG. 6, opposite half-cycles of an isolated A.C. source connected therewith sample the normally conducting controlled rectifiers.

The system is also provided with a logic circuit means 54 which is responsive to a number of signal voltages and operates to allow a desired motor operating condition to be established if the control system 10 is capable of operation in that condition. Accordingly, logic circuit means 54 receives one or more operating command signals representing a desired motor operating condition, as well as, signal voltages from firing circuit means 42 and detector means 49. In FIG. 1 three operating command signals are shown applied to logic circuit means 54, although it is to be understood that more or less than three such command signals may be applied.

For purposes of better understanding the invention and its operation in connection with a vehicle drive, assume that forward motoring operation requires a forward direction command signal to be applied to input means 55 (reverse motoring requiring a reverse direction command signal applied to input means 56) and a no-brake command signal to be applied to input means 57. As will become evident from the later detailed description of the system, the no-brake command signal is used to provide a "fail-safe" mode of operation which is required for many traction applications when the system is used to control the motors of a vehicle, such as the direct current traction motors of a locomotive, for example. The absence of the no-brake signal, for any reason, results in the control system establishing the regenerative braking condition of operation.

Logic circuit means 54 also receives a signal voltage from firing circuit means 42 indicating its operation and a signal voltage from detector means 49 indicating that at least one field circuit controlled rectifier is in a conducting state. Also an output signal from logic circuit means 54 is applied over conductor 58 to firing circuit means 42 and another output signal is applied over conductor 59 to control circuit means 16.

The control system 10 also includes one or more means for producing signal voltages which bear a predetermined relationship to some selected operating conditions. In the particular system illustrated in FIG. 1, signals are produced which bear a relationship to armature current, armature voltage, and rate-of-change of armature current. It is to be understood that other operating conditions could be selected, such as motor speed or the tension in a web of material. Suitable error signals can then be produced in well known manner by comparing the signals associated with the selected operating conditions with an appropriate fixed or adjustable reference voltage and the operation of the direct current motor will be controlled in accordance with such signals.

The various reference signal sources may be provided in any suitable manner and have been illustrated in FIG. 1, for simplicity, as being provided by potentiometers, the setting of the movable taps of which determines the magnitude of the reference. As will become evident, the reference voltages are used in a manner which establishes the maximum limit of a selected system parameter. As used herein the term "error signal" is intended to include this mode of operation as well as the mode of operation wherein both the magnitude and the polarity of the error signal may vary and be used to control the operation.

As shown in FIG. 1, therefore, a potentiometer 60 is provided to establish the reference for the desired positive rate-of-change of armature current. That is, the rate-of-change of current as current is increased from zero to some desired level. Similarly, a potentiometer 61 is provided to establish the reference for the desired negative rate-of-change of armature current. That is, the rate-of-change of current during the time the curent is being forced from some level toward zero. A transistor 63 is connected in shunt with potentiometer 61 and operates, when conducting, to nullify the negative rate-of-change of current reference voltage signal otherwise provided by potentiometer 61.

A signal related to the rate-of-change of motor armature current is applied from a suitable rate sensing means 64, shown as a rate transformer, to an input means of a rate comparison circuit means 65 where that signal is suitably compared with the signal from the rate reference signal sources 60 or 61 to produce error signals related to the positive rate-of-change of armature current or the negative rate-of-change of armature current. These error signals are applied to the input means 66 and 67 of control circuit means 16.

Figure 3:
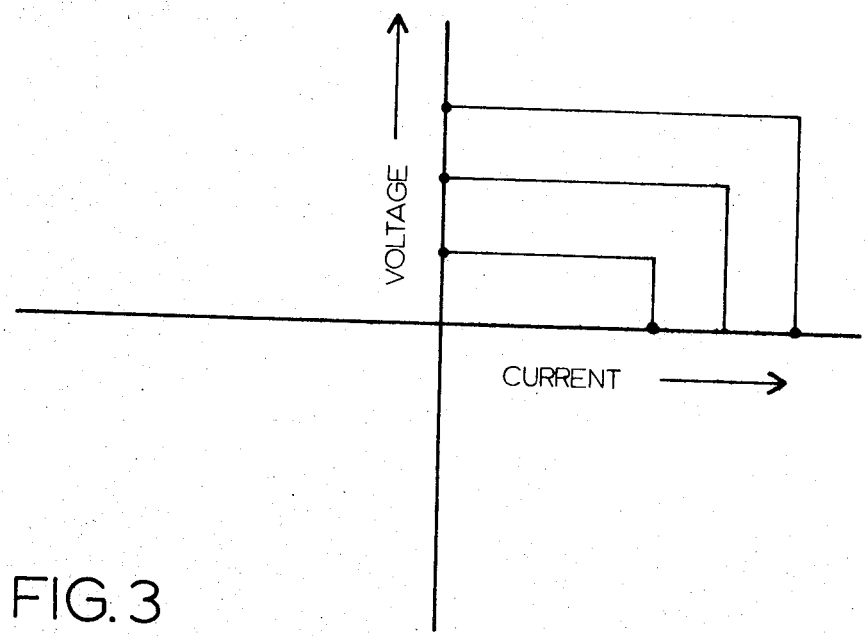
FIG. 3 is a graph of motor armature current and voltage for different settings of an adjustable reference voltage signal source.

In the system illustrated in FIG. 1 motor armature current and voltage are to be regulated in accordance with the characteristic of FIG. 3. That is, both motor armature current and voltage are regulated at maximum values. To this end, there is provided a potentiometer 68. For the particular system to be described potentiometer 68 provides for a reference voltage of from 0 to 22 volts to regulate the motor armature current at a maximum value of 500 amperes and the motor armature voltage at a maximum value of 500 volts. That is, the reference source provides for regulation of the armature current and voltage of about 22.5 volts or amperes per volt of reference.

In addition to the foregoing, the system shown in FIG. 1 includes specific over-voltage limits which have different maximum values for motoring and breaking operations. To provide for these different over-voltage limits the system also includes a potentiometer 70 and a potentiometer 72. Potentiometer 70 provides the reference signal source for the over-voltage limit for motoring operation while potentiometer 72 provides the reference signal source for the over-voltage limit for the regenerative braking operation.

A signal related to motor armature voltage is applied from armature voltage measuring means 76, which may be a voltage measuring reactor, or other suitable voltage measuring means, to an input 78 of a current-voltage comparison means 79. Also, a signal related to motor armature current is applied from armature current measuring means 80, which may be a current measuring reactor or other suitable current measuring means, to an input 81 of current-voltage comparison means 79. These current and voltage feed-back signals are suitably compared with the reference voltage signals provided by the current-voltage reference signal sources 68, 70 and 72 and error signals related to armature current and voltage are supplied from output means 84 and 85, respectively, to input means 88 and 90 of control circuit means 16.

As indicated previously, control circuit means 16 is arranged so that the net phase-shift in its output may be influenced by the various error signals and is capable of a phase-shift from 0° to 155°. This phase-shiftable output is applied from the various output means of control circuit means 16 to the gate electrodes of the controlled rectifiers of bridge circuit 14 to provide for the full, two-way control thereof so that the output voltage may be varied between maximum positive and negative limits in accordance with the system feed-back signals. Accordingly, the system provides for regulation of the operating condition of the motor M from an alternating current power supply and with smooth, controllable transition between motoring and regenerative braking operating conditions.

The control system 10 may also be provided with various additional circuit means for detecting improper connections or conditions which could result in damage to the control system or the motors or unsatisfactory operation thereof. Some of such means are shown in FIG. 1, such as a phase balance detector 92 and a phase sequence detector 93. The detectors 92 and 93 are connected with the power supply lines $L_1$, $L_2$ and $L_3$ and provide an output signal to the control means 16 if a phase unbalance or improper phase sequence exists.

For example, phase balance detector 92 receives current signals related to the currents in each of the three phases of the supply. If for any reason the phase currents are unbalanced, an output signal is generated and fed to control circuit means 16 to cause the firing angle to be retarded to 155°. When desired, timing means (not shown) may be associated with the phase balance detector 92 so that the phase angle will be retarded at 155° for a predetermined time, say one second, and then normal operation attempted again. If the phase unbalance were to persist for more than a preselected number of attempts, say 10, then the phase angle will be locked permanently at 155° giving an indication of a fault condition. Such a fault condition could be caused by such things as failure to fire one or more of the controlled rectifiers of bridge circuit 14, a failure of the firing circuitry of control circuit means 16 or failure of a controlled rectifier fuse, if such fuses are employed.

Similarly, phase sequence detector 93 receives input phase voltages and produces an output signal if an improper phase sequence is detected; the output signal being fed to control circuit means 16 to stop all firing signals to the controlled rectifiers of bridge circuit 14.

If the field is shorted in a series motor no field current will flow therein and the torque developed by the motor will be very low and not enough to drive the load. The armature current, however, could be quite large being limited to the level set by the reference of potentiometer 68. This current could persist at this value for an extended period without sufficient torque being produced to cause rotation of the motor armature. The resultant heat to the motor commutator bar would cause damage to the motor.

Accordingly, in FIG. 1 there is shown a field current sensing means 94 and an armature and field current comparison circuit means 95. In normal operation the motor field and armature currents are, of course, the same and no output signal is produced by comparison circuit 95. On the other hand, with a field short, field current is zero while armature current is at the value set by reference potentiometer 68, and a large error signal is produced by comparison circuit 95. Thus, if the armature current is greater than the field current, comparison circuit 95 operates to generate an output which is fed to control circuit means 16 to cause the firing angle to be shifted to 155°. This current unbalance arrangement may also operate with a timing means as described in connection with phase balance detector 92.

For example, the detected field short condition may be due to a shorted field circuit controlled rectifier, or merely to a falsely fired one. In the first case the fault is probably permanent and the system will shut down after the preselected number of attempts at normal operation. In the second situation, on the other hand, corrective action would occur to prevent motor damage and when normal operation is again attempted, in all probability, the falsely fired controlled rectifier would not again be so falsely fired and motor operation could continue normally. Such an arrangement assures protection for the control system and motors while preventing complete shut-down of the system for transient or spurious fault conditions.

GENERAL DESCRIPTION OF OPERATION

In operation, assume, initially, that the logic circuit means 54 has a forward-direction command signal applied to its input means 55 and a no-brake signal applied to its input means 57. Assume also, that the characteristic to be regulated is as shown in FIG. 3, which is a graph of motor armature current and voltage for different settings of adjustable reference voltage source 68. Also, as set forth in the foregoing description, any change in the value of the reference voltage source 68 between 0 and 22 volts is operative to provide a change in the armature voltage and current limit values of about 22.5 volts or amperes per volt of reference.

With the foregoing operating command signals applied to logic circuit means 54 and all controlled rectifiers 34, 36, 38, and 40 in their forward blocking states, as evidenced by the absence of an output signal from field circuit detecting means 49, logic circuit means 54 signals firing circuit means 42 to establish the operating condition called for, namely, forward direction of motoring. Accordingly, the appropriate portion of firing circuit means 42 becomes operative and applies continuous gate drive to the control electrodes of controlled rectifiers 34 and 36 which thereby arranges the power loop for the forward direction of motoring. That is, a path is established to allow for current flow in field winding 28 in the direction from terminal 32 to terminal 30. No current will flow in this power loop from the alternating current source, however, until the movable tap of potentiometer 68 is moved from zero to provide a reference voltage signal.

Assume now that the potentiometer 68 is set to provide a reference voltage signal of 10 volts. Since the armature current and voltage feed-back signals are both zero at this time, there will be a large current and voltage error signal applied to control circuit means 16 signalling it to cause the firing angle to move from around 90°, the condition of zero bridge circuit output, toward 0°, the condition for maximum bridge circuit output. Since a rate-of-change of armature current signal also influences the net phase-shift of the firing pulses from control circuit means 16, the motor armature current does not rise abruptly to the value set by the reference potentiometer 68 but rather rises at a preselected rate established by the rate reference voltage value established by potentiometer 60. In one particular system, for controlling the traction motors of a locomotive, a rate of 100 amperes per second provided for the desired smooth starting and desired rate-of-change of acceleration. The actual rate-of-change of current established for a given system will depend upon the various factors to be considered in the specific application of the control system.

With the foregoing 10 volt reference setting of potentiometer 68, an armature current limit of 225 amperes is established. At the foregoing rate of 100 amperes per second, this limit will be reached in just over two seconds. The control circuit means 16 now causes phase-shifting of the output pulses thereof back toward 90° to regulate the motor armature current at this selected 225 ampere value. The system is now in a current limit mode of operation.

As the motor armature accelerates, the counter EMF of the motor increases and the feed-back signal from the voltage measuring means 64 also increases until a value of 225 volts is reached. At such time, the system will transfer to the voltage limit mode of operation and cause the motor armature voltage to be regulated at 225 volts in accordance with the characteristic of FIG. 3. Any change in the previously set 10 volt reference provides a corresponding change in the foregoing described current and voltage limits of about 22.5 volts or amperes per volt of reference.

By reference to the field circuit means 24, it will be evident that motoring in the reverse direction will be accomplished in a similar manner in response to application of a reverse direction operating command signal at reverse input means 56 in place of the forward direction command signal at forward input means 55. Under such condition the logic circuit means 54 signals firing circuit means 42 to continuously apply gate drive to controlled rectifiers 38 and 40 instead of to controlled rectifiers 34 and 36. Since the current will then flow in field winding 28 in the opposite direction, from terminal 30 to terminal 32, a reverse direction of rotation of the motor armature results.

The control system of this invention also provides for "regeneration" or regenerative braking. That is, an operating condition in which the driven equipment (machine, vehicle, or the like) actually drives the motor as a generator causing normal power flow to be reversed. Under these conditions the motor applies a negative or braking torque to the normally driven load. Since the controlled rectifiers of bridge circuit 14 allow current flow in only one direction, the control system 10 must be arranged to provide for sufficient control to allow for both normal motoring and regeneration. Accordingly, means must be provided to allow the motor being controlled to be converted into a generator and rectifier bridge circuit 14 must be controlled to operate as an inverter to effect regeneration when the motor becomes a generator.

It is well known that an electric motor to be controlled can be converted into a generator in any of the following ways:

(1) Change in the operating conditions. For example, a change in the speed of the motor so that the motor counter EMF exceeds the applied voltage;
(2) Changing the electric circuits; or
(3) Changing the circuit constants in the existing motor circuits so that the counter EMF generated by the motor exceeds any value of voltage applied to the motor.

In the embodiment of the control system of this invention illustrated in FIG. 1, motoring operation is provided by causing current to flow in a given direction in the motor armature circuit and regenerative braking operation is provided by reversing the terminal voltage of the source while current continues to flow in the same direction in the motor armature circuit. This is accomplished by reversing the motor field, thereby reversing the motor flux and the polarity of the counter EMF, and controlling the firing angle of bridge circuit 14 so that it produces a negative output. The reversal of the counter EMF of the motor and control of the firing of the controlled rectifiers of bridge circuit 14 combine to produce inverter operation of the bridge circuit 14 resulting in energy from the rotating motor armature being supplied to the alternating current power supply to produce the desired regenerative braking action.

Assume now that the control system is operating in the forward motoring direction, as previously described, under a 10 volt reference voltage setting on potentiometer 68 and it is desired to transfer to a regenerative braking operating condition. Such a transfer is effected, in the arrangement illustrated in FIG. 1, by removing the no-brake signal from no-brake input means 57 of logic circuit means 54. With the no-brake signal removed, logic circuit means 54 immediately signals firing circuit means 42 to cease applying gate drive to forward direction controlled rectifiers 34 and 36. The mere removal of gate drive from controlled rectifiers 34 and 36, however, is not effective to return them to their forward blocking state and they continue to conduct until the current through them is reduced below the minimum holding current of such controlled rectifiers.

At the same time, logic circuit means 54 signals control circuit means 16 to produce output trigger signals to bridge circuit 14 which are phase-shifted toward 155°, thereby producing a negative output of bridge circuit 14 of about 500 volts. Since this control is under closed-loop operation, the motor armature current is forced toward zero at a very rapid rate. For example, for a motor having an inductance L of about 20 millihenries, the motor armature current can be reduced to zero at a rate of about 25,000 amperes per second. That is, since $$E = L\frac{dI}{dt}$$

$$E = 500 \text{ and } L = 20 \times 10^{-3}$$

$$\frac{dI}{dt} = \frac{500}{20 \times 10^{-3}} = 25,000 \text{ amperes/second}$$

Accordingly, for the 10 volt reference setting of potentiometer 68 in the foregoing motoring operation, which establishes an armature current of 225 amperes, the system would force this current to zero in about 9 milliseconds.

If the negative rate-of-change of current were to exceed the foregoing value of 25 amperes per millisecond, the voltage induced in the series field winding 28 could exceed the safe design value, which in the system being described is 500 volts. Accordingly, to avoid any such problem, a negative rate-of-change of current reference is provided to allow for proper regulation of the current at a preselected maximum rate during the collapse of the inductive stored energy.

To this end, the system includes a potentiometer 61 which produces the desired negative rate-of-change of current reference voltage signal. A comparison of the signal from rate transformer 64 is made with such reference signal to derive the negative rate-of-change of current error signal. Thus, the phase angle firing of bridge circuit 14 is continuously controlled in accordance with the negative rate-of-change of current error signal to force the collapse of the current at the desired rate, say 25 amperes per millisecond.

In operation, the error signal initially moves the firing angle to maximum retardation (155°) and, if the current collapses at a rate where the rate signal from rate transformer 64 exceeds the negative rate reference provided by potentiometer 61, the firing angle is moved toward 0° to regulate the rate-of-change of current at the desired level. Before the foregoing operation of decreasing the current to zero can begin, logic circuit means 54 must signal firing circuit means 42 to cease applying gate drive to the controlled rectifiers of field circuit means 24. Accordingly, as long as firing circuit means 42 is operating and applying gate drive to either pair of controlled rectifiers 34–36 or 38–40, then the current must be regulated at the preselected operating rate, say 100 amperes per second, and not at the forcing rate of, say 25,000 amperes per second.

This selective rate control operation is provided by transistor 63 which receives a signal at its base electrode to render it conductive whenever firing circuit means 42 is operative and applying gate drive to either pair of controlled rectifiers of field circuit means 24. Since transistor 63 has its emitter-collector circuit connected in shunt with reference signal source 61, this negative rate-of-change of current reference signal is nullified whenever transistor 63 is conductive.

When the armature current is reduced to substantially zero, the previously conducting controlled rectifiers 34 and 36 will return to their forward blocking state. Since normally controlled rectifiers 38 and 40 should also be in their forward blocking states, the condition of all controlled rectifiers in the forward blocking state is detected by detector means 49 and it ceases to apply a signal to logic circuit means 54. The absence of this signal from detector means 49 causes logic circuit means 54 to signal firing circuit means 42 to continuously apply gate drive to the other pair of field circuit controlled rectifiers 38 and 40. At the same time, logic circuit means 54 signals control means 16 to cause the firing angle to shift toward 0°. As soon as the firing angle moves below 90°, current begins to flow through the field winding 28. Since, now, controlled rectifiers 38 and 40 are the conducting pair, this current flows through field winding 28 in the opposite direction and causes the motor counter EMF to change in polarity and thus be compatible with regenerative braking operation by control of power conversion means 12.

As indicated, the rate-of-change of current is controlled in accordance with the rate feedback signal and, since transistor 63 is now conductive to nullify rate reference signal source 61, this regenerative braking current will rise at the preselected operating rate, say 100 amperes per second, until it reaches the maximum level established by the setting of the current-voltage reference. That is, if the reference setting of potentiometer 68 is still kept at 10 volts the current will rise at the prescribed rate of 100 amperes per second until a value of 225 amperes is reached and will then be regulated at this value until the motor is brought to a stop.

While the foregoing example has indicated a rate-of-change of motor armature current during motoring and regenerative braking of 100 amperes, a different rate may, of course, be selected depending upon the overall performance requirements of the system. Also, a different limit for the negative rate-of-change of current may be selected.

The reverse sequence of events takes place if the no-brake signal is now reapplied to the no-brake input means 57 of logic circuit means 54. That is, the regenerative braking current will be forced to zero at about 25 amperes per millisecond and detector means 49 will again detect the forward blocking state of the field circuit controlled rectifiers and allow the other (forward) pair of controlled rectifiers to become conductive. Accordingly, since a forward direction operating command signal is still applied to input means 55 of logic circuit means 54, forward motoring operation will commence in response to the controlled positive rate-of-change of motor armature current and the desired regulated quantity as established by the setting of the reference signal source 68.

In the foregoing description the desired motor operating condition was shown as established in response to external operating command signals, and the change between motoring and braking was effected by removing the no-brake signal. While this is very convenient in providing for the control of a vehicle, especially the remote control thereof, it will be understood that the desired operating conditions may be established in any other suitable manner. For example, for a more conventional adjustable speed drive application, such as a web press, a rolling mill, or the like, the system may be arranged to operate in a more closed-loop mode. That is, the polarity of a signal, such as a speed-error signal for example, may be suitably employed to signal the change between motoring and braking operating conditions.

DETAILED DESCRIPTION

Figure 4:
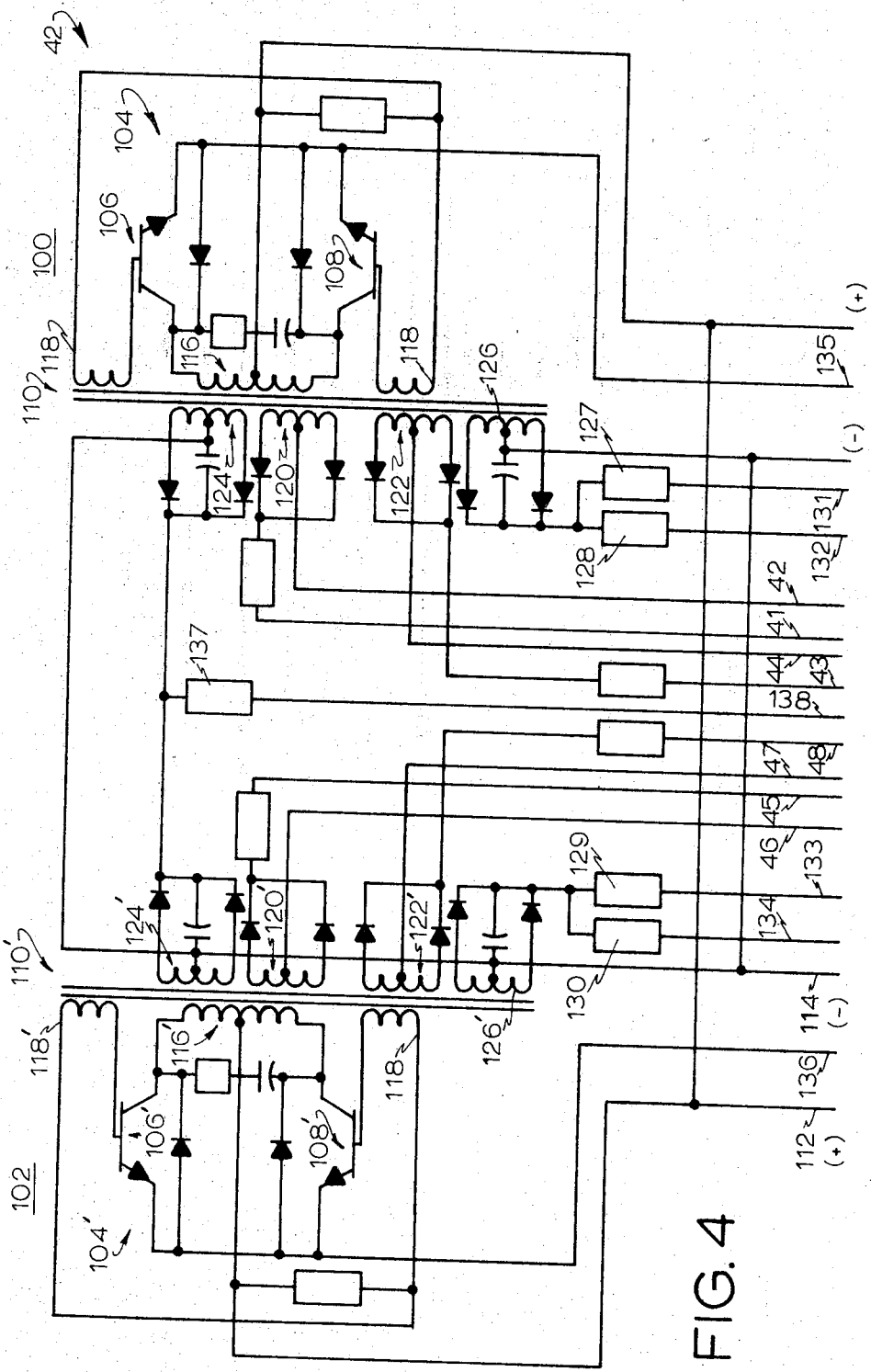
FIG. 4 is a schematic circuit diagram of a suitable field circuit firing circuit means.

Field firing circuit 42 (FIG. 4)

In FIG. 4 there is shown a schematic circuit diagram of one firing circuit arrangement suitable for use as field firing circuit means 42 of FIG. 1. As shown, firing circuit means 42 comprises two similar sections 100 and 102. Since both sections are the same, only section 100 will be described in complete detail; the corresponding components in section 102 being designated by the prime notation.

Each section 100 and 102 comprises a pulse producing means, shown as a transistor-magnetic square wave oscillator 104 of a type now well known in the art. Oscillator 104 comprises a pair of switching transistors 106 and 108 and a saturating core transformer 110. A suitable direct current voltage supply, such as the control voltage supply of the system, is adapted to be connected with the conductors 112 and 114 and is switched with alternating polarity across a first winding 116 of transformer 110 by the transistors 106 and 108. A feed-back winding 118 of transformer 110 is arranged to apply voltages induced in such winding to each of the transistors 106 and 108 with polarities effective to establish opposing operating conditions of the transistors. Thus, transistors 106 and 108 transfer from one to the other of their operating states (ON-OFF) in response to voltage induced in the feed-back winding 118. The desired control signals may be obtained from additional windings provided on transformer 110. To this end, firing circuit means 42 is provided with a plurality of output windings 120, 122, 124 and 126.

The output of winding 120 is suitably rectified and applied over conductors 41 and 42 to the gate and cathode electrodes of field circuit controlled rectifier 34. Similarly, the output of winding 122 is rectified and applied over conductors 43 and 44 to the gate and cathode electrodes of the controlled rectifier 36 of the field circuit means 24. The outputs of windings 120' and 122' are similarly rectified and applied over conductors 45 and 46 and 47 and 48 to the gate-cathode electrodes of the controlled rectifiers 38 and 40 of the field circuit means 24. Thus, for the arrangement illustrated in FIG. 1 section 100 operates to produce firing pulses to establish the field connection for the forward direction of motoring and the reverse regenerative braking condition, while section 102 operates to produce firing pulses to establish the field connection for the reverse direction of motoring and the forward regenerative braking conditions. For convenience in the later detailed description of the operation of the system, oscillator 104 of section 100 may be referred to simply as the "forward oscillator" and oscillator 104' of section 102 as the "reverse oscillator."

The output of winding 126 is rectified and applied through resistances 127 and 128 and over conductors 131 and 132, respectively, to logic circuit means 54 (FIG. 5). Similarly, the output of winding 126' is rectified and applied to logic circuit means 54 through resistances 129 and 130 and over conductors 133 and 134, respectively. The oscillators 104 and 104' are selectively energized by signals supplied from logic circuit means 54. Accordingly, an energizing signal is supplied from logic circuit means 54 to forward oscillator 104 over conductor 135 and a similar energizing signal is supplied to reverse oscillator 104' over conductor 136.

During operation in either motoring or regenerative braking, the motor current must be regulated in accordance with the positive rate-of-change of current reference rather than in accordance with the negative rate-of-change of current reference. Accordingly, means must be provided during such operation to nullify the negative rate-of-change of current reference provided by potentiometer 61. Since during operation in either motoring or regenerative braking, one of the oscillators 104 or 104' must be energized, the required nullification of the negative rate-of-change of current reference can be very conveniently accomplished by causing transistor 63, which shunts potentiometer 61, to be conductive whenever either oscillator 104 or 104' is energized.

To this end, the outputs of windings 124 and 124', associated respectively with oscillators 104 and 104', are applied through a suitable resistance 137 and over conductor 138 to the base electrode of transistor 63. Thus, transistor 63 will be in a conducting state to nullify the negative rate-of-change of current reference signal provided by potentiometer 61 whenever either oscillators 104 and 104' are energized. Conversely, transistor 63 is in a nonconducting state only when both oscillators 104 and 104' are inoperative.

LOGIC CIRCUIT MEANS (FIGS. 5a and 5b)

In FIGS. 5a and 5b there is shown an arrangement suitable for use as the logic circuit means 54 of FIG. 1. As shown, logic circuit means 54 includes a number of input means 55, 56, and 57. Input means 55 is adapted to receive a forward direction operating command signal, input means 56 a reverse direction operating command signal and input means 57 a no-brake operating command signal.

Forward direction input means 55 comprises a pair of transistors 150 and 152, the emitter electrodes 153 and 154 of which are connected in common and through a resistance 155 to a source of operating command signals (not shown). A resistance 158 is connected between emitter electrode 153 of transistor 150 and the base electrode 159 thereof. Similarly, a resistance 160 is connected between emitter electrode 154 of transistor 152 and the base electrode 162 thereof. The parallel combination of a resistance 163 and a capacitance 164 is connected between emitter electrodes 153 and 154 and a point of common reference potential, such as the negative side of the control voltage source connected with conductor 114. The base electrode 159 of transistor 150 is connected through a diode 166 with a junction 168. Base electrode 162 of transistor 152 is connected through diode 169 with a junction 170. Collector electrode 172 is connected through a diode 173 with a junction 174 which is in turn connected through a resistance 175 with a reverse oscillator control means 176. The collector electrode 178 of transistor 152 is connected through a diode 179 with a junction 180 which in turn is connected through a resistance 181 with a forward oscillator control means 182.

Reverse direction input means 56 is similar to forward direction input means 55 and comprises a pair of transistors 190 and 192 having their emitter electrodes 193 and 194 connected in common and through a resistance 195 with a source of operating command signals. A resistance 198 is connected between electrode 193 and base electrode 199 of transistor 190. Also, a resistance 200 is connected between emitter electrode 194 of transistor 192 and the base electrode 202 thereof. The parallel combination of a resistance 204 and a capacitance 205 is connected between emitter electrodes 193 and 194 and with conductor 165. The base electrode 199 of transistor 190 is connected through a diode 206 with the junction 170; base electrode 202 of transistor 192 being connected through a diode 208 with the junction 168. The collector 210 of transistor 190 is connected to a diode 212 with junction 174 and thence with reverse oscillator control means 176 while collector electrode 214 of transistor 192 is connected through a diode 216 with the junction 180 and thence with forward oscillator control means 182.

Forward oscillator control means 182 comprises a start transistor 220 and a lock-out transistor 224. Start transistor 220 is controlled by a signal from forward input means 55 to cause forward oscillator 104 to be energized while lock-out transistor 224 is controlled by signals from no-brake input means 57 and field detector circuit means 49 and operates to prevent forward oscillator 104 from being so energized. Additional signals may be provided such as for example a motion signal, and employed to control lock-out transistor 224.

Start transistor 220 has its base electrode 226 connected through resistance 181 with the junction 180 of forward input means 55. The emitter electrode 228 is connected to the conductor 165 and a resistance 229 is connected between the base and emitter electrodes. The collector electrode 230 is connected with forward oscillator 104 over conductor 135 so that when transistor 220 is conductive oscillator 104 is energized through the collector-emitter circuit thereof.

The emitter electrode 232 and collector electrode and collector electrode 234 are connected in shunt with the base and emitter electrodes of start transistor 220. Accordingly, when forward oscillator lock-out transistor 224 is conductive, the base drive signal for start transistor 220 is by-passed through lock-out transistor 224 causing start transistor 220 to be turned off and hence turning off forward oscillator 104. A resistance 236 is connected between the base electrode 235 and the emitter electrode 232 of forward oscillator lock-out transistor 224. The base electrode 235 is connected over conductor 134 with the field firing circuit means 42, with the output terminal 384 of field detector circuit means 49 through a diode 237 and resistances 238 and 240, and also with the no-brake input means 57.

Reverse oscillator control means 176 is similar to forward oscillator control means 182 and comprises a start transistor 241 and a lock-out transistor 242. The base electrode 244 of start transistor 241 is connected through resistance 175 with the junction 174 of reverse input means 56. A resistance 245 is connected between the base electrode 244 and the emitter electrode 248 which is in turn connected to the negative side of the control voltage source. Collector electrode 250 is connected over conductor 136 with the reverse oscillator 104'. Thus, when transistor 241 is conducting reverse oscillator 104' is energized.

Lock-out transistor 242 has its emitter electrode 252 and collector electrode 254 connected in shunt with the base and emitter electrodes of start transistor 241. Accordingly, when reverse oscillator lock-out transistor 242 is conductive, the base drive signal for start transistor 241 is by-passed through lock-out transistor 242 causing start transistor 241 to be turned off and hence turning off reverse oscillator 104'. A resistance 256 is connected between the emitter electrode 252 and the base electrode 255 of lock-out transistor 242. The base electrode 255 is connected with field firing circuit means 42 over conductor 131, with the output terminal 384 of field detector circuit means 49 through a diode 257 and resistances 258 and 240, and with the no-brake input means 57 over conductor 259.

No-brake input means 57 comprises three transistors 260, 262, and 264 each having a base, an emitter and a collector electrode. Transistor 260 has its emitter electrode 266 and transistor 262 its emitter electrode 268 connected to the negative side of the control voltage source. The base electrode 270 of transistor 260 is connected through a resistance 271 with a junction 272 with which the base electrode 273 of transistor 262 is also connected through a resistance 274. Junction 272 is in turn connected through a resistance 275 with a source of operating command signals. A resistance 276 is connected between the base and emitter electrodes of transistor 260 and a resistance 278 is similarly connected between the base and emitter electrodes of transistor 262.

The collector electrode 280 of transistor 260 is connected with a junction 282 and through a resistance 284 and diode 285 with the base electrode 235 of forward oscillator lock-out transistor 224. Collector electrode 280 is similarly connected through a resistance 288 and a diode 289 with the base electrode 255 of reverse oscillator lock-out transistor 242. Collector electrode 280 is further also connected through a resistance 290 with a source of positive potential, shown as the positive side of the control voltage source connected with conductor 112.

Transistor 262 has its collector electrode 291 connected through a resistance 292 with the junction 170 and also through a diode 293 and a resistance 294 with conductor 112 and the positive side of the control voltage source. The emitter electrode 295 of transistor 264 is connected through a diode 296 to conductor 114 and the negative side of the control voltage source. The collector electrode 297 of transistor 264 is connected through a resistance 298 with the junction 168. The base electrode 299 of transistor 264 is connected to the resistance 294 and the positive side of the control voltage source over conductor 112. A resistance 300 is connected between the base electrode 299 of transistor 264 and the emitter electrode 295 thereof.

During operation of the control system 10 in either motoring or braking either forward oscillator 104 or reverse oscillator 104' must be operating. During such operation, hovewer, there will also be a signal produced by field circuit detector means 49 and, while this signal must at times be capable of locking-out the forward and reverse oscillators 104 and 104', such lock-out action must not occur when an oscillator is operating or normal motoring and regenerative braking operation would not be possible. Accordingly, logic circuit means 54 includes means for nullfying the signal from the field detector circuit means 49 whenever either of the oscillators 104 or 104' is in operation.

To this end, logic circuit means 54 includes a pair of transistors 301 and 302 operatively associated with forward oscillator 104 and reverse oscillator 104' respectively. Transistor 301 has its emitter electrode 304 connected with conductor 114 source, its collector electrode 306 connected with the junction 308 between resistance 238 and diode 237 and its base electrode 310 connected through resistance 312 to conductor 114 and also, over conductor 132, with the output signal from winding 126 of forward oscillator 104.

Thus, transistor 300 is connected to become conductive whenever forward oscillator 104 is operative and operates to by-pass the signal from field detector means 49, which otherwise would be applied through diode 237 to turn on lock-out transistor 224 and turn off the forward oscillator 104.

Transistor 302 is similarly associated with reverse oscillator 104' and the reverse oscillator lock-out transistor 242. For example, transistor 302 has its emitter electrode 320 connected with conductor 114, its collector electrode 322 connected with the junction 324 between diode 257 and resistance 258 and its base electrode 326 connected through a resistance 328 to conductor 114. Base electrode 326 is also connected over conductor 133 with the output signal from winding 126' of reverse oscillator 104'.

Under certain conditions, for example when certain system faults exist, it is advantageous to be able to short the motor field winding. This may be very conveniently provided in the control system of this invention by causing all of the field circuit controlled rectifiers 34, 36, 38, and 40 to become conductive at the same time. All of the field circuit controlled rectifiers may be rendered conducting at the same time by arranging to simultaneously energize both forward oscillator 104 and reverse oscillator 104' whenever it is desired to short the motor field winding.

To this end, logic circuit means 54 comprises a field shorting control transistor 340 having its base electrode 342 connected through a suitable resistance 343 to the field shorting signal source (not shown) and its emitter electrode 346 connected to conductor 114 and the negative side of the control voltage source. A resistance 347 is connected between the base and the emitter electrodes. Forward oscillator 104 is connected with collector electrode 348 over conductor 135 and through a diode 350. Reverse oscillator 104' is similarly connected with collector electrode 348 over conductor 136 and through a diode 352.

Accordingly, when field shorting control transistor 340 is rendered conductive by the application of a signal to its base electrode, both the forward oscillator 104 and the reverse oscillator 104' are energized through the collector-emitter circuit of such transistor and firing signals are applied simultaneously to the controlled rectifiers 34, 36, 38, and 40 to turn them all on and thereby short the motor field winding as desired.

FIELD DETECTOR CIRCUIT
(FIG. 6)

In FIG. 6 there is shown a schematic circuit diagram of an arrangement suitable for use as detector means 49 of FIG. 1. Although other detector circuit arrangements for producing an output signal whenever any of the field circuit controlled rectifiers are conducting may be suitable, the arrangement illustrated in FIG. 6 is preferred, since the motor field winding is not included in the normal sensing loop. This is highly desirable since the inductance of the field winding could cause reactive voltages to be developed during operation which could adversely affect operation of the detector means.

As shown in FIG. 6, the detector circuit means 49 comprises a transformer 360 having a primary winding 362 and two center-tapped secondary windings 364 and 366. Primary winding 362 has one end terminal 368 adapted for connection with one line $L_1$ of a suitable isolated alternating current voltage source (not shown). The other end terminal 370 of primary winding 362 is connected with a terminal 372 at one diagonal of a full-wave bridge rectifier 374, the opposite diagonal terminal 376 of which is adapted for connection through a suitable resistance 378 to the other line $L_2$ of the isolated alternative current voltage source. The other diagonal terminals 380 and 382 of rectifier 374 are connected with a pair of output conductors 384 and 386. A resistance 388 and a capacitance 390 are connected in parallel across the output conductors 384 and 386 to provide the desired filtering.

Terminal 400 of winding 364 and terminal 402 of winding 366 are connected to terminal $d$ through their respective resistance-diode combinations 404–408 and 410–412. That is, terminal 400 is connected with terminal $d$ through resistance 404 and diode 408 while terminal 402 is connected with terminal $d$ through resistance 410 and diode 412. Also, center-tap terminal 420 of winding 364 is connected with terminal $b$ while center-tap terminal 425 of winding 366 is connected with terminal $c$. The other end terminals 428 and 430, respectively, of windings 364 and 366 are connected through resistance-diode combinations 432–434 and 436–438 with terminal $a$ of the detector circuit.

As shown in FIG. 1, terminal $a$ is connected over conductor 50 with field circuit terminal 27, terminal $b$ is connected over conductor 51 with field circuit terminal 30, terminal $c$ is connected over conductor 52 with field circuit terminal 32, and terminal $d$ is connected over conductor 53 with field circuit terminal 26.

In operation, the A-C voltage supplied to primary winding 362 is rectified by bridge rectifier 374 and suitably filtered by resistance 388 and capacitance 390 to provide a direct current signal at the output conductors 384 and 386 indicating current flow through a controlled rectifier of the field circuit means 24; the two center-tapped secondaries 364 and 366 being arranged so that opposite half-cycles of the A-C source on lines $L_1$ and $I_2$ sample the normally conducting pairs of controlled rectifiers of field circuit means 24.

For example, observing the conventional dot motation, during one half-cycle of the A-C supply on lines $L_1$ and $L_2$ a voltage in the forward conducting direction will be applied by secondary winding 366 to the controlled rectifiers 34 and 40 of the field circuit means 24. During the other half-cycle a similar voltage will be applied by secondary winding 364 to the controlled rectifiers 36 and 38.

If all of the controlled rectifiers 34, 36, 38 and 40 are in a forward blocking state no current will flow in them from secondary winding 364 or 366 and only the transformer exciting current will flow. This exciting current will produce a small output signal at output conductors 384 and 386. If, on the other hand, any one of the controlled rectifiers is in a conducting state there will be a flow of secondary current which will cause a larger output signal to be produced at output conductors 384 and 386. That is, the output due to the transformer exciting current can be made small compared to the output when secondary current flows. Accordingly, the detector arrangement shown in FIG. 6 can very easily be made to produce a detectable output at the conductors 384 and 386 only when secondary current flows which can only occur if one or more of the field circuit controlled rectifiers 34, 36, 38 and 40 are in a conducting state.

In the arrangement illustrated in FIG. 6, resistances 404, 432, 436 and 410 are provided to limit the sensing current to a level which is well below the minimum holding current of the controlled rectifiers of field circuit means 24 so as not to interfere with the normal return of such controlled rectifiers to their forward blocking states when the motor armature current is forced to zero. It will be understood, however, that since once each cycle the sensing current goes to zero for one half-cycle, the sensing current could actually be greater than the minimum holding current of the controlled rectifiers and still not interfere with their return to their forward blocking states. Diodes 408, 434, 438 and 412 are provided to prevent the forward blocking voltage from being reflected back into the secondary windings 364 and 366.

DETAILED DESCRIPTION OF OPERATION

The following detailed description of the operation of the control system of the invention may best be understood by reference to the schematic circuit diagrams of FIGS. 4, 5 and 6 arranged as illustrated in FIG. 8; FIG. 1 being referred to also for the overall organization as well as for a showing of the various circuit means for which no detailed schematic circuit diagrams have been provided.

MOTORING OPERATION

For control system 10 to be capable of operation in the motoring condition, logic circuit means 54 must not only receive a direction signal at one of the input means 55 or 56, but also a no-brake signal must be present at the no-brake input means 57.

Referring now more specifically to FIG. 5, it will be observed that the no-brake signal at input means 57 saturates transistor 260 which by-passes the signals from the positive side of the control voltage source which would otherwise be applied to turn on both the forward and reverse oscillator lock-out transistors 224 and 242. For example, the turn-on signal for forward oscillator lock-out transistor 224 would otherwise be applied from junction 282 and through resistance 284 and diode 285 to base electrode 235. Similarly, the turn-on signal for reverse oscillator lock-out transistor 242 would otherwise be applied from junction 282 and through resistance 288 and diode 289 to base electrode 255.

The no brake signal at input means 57 also operates to turn on transistor 262 which cuts off interconnected transistor 264 while at the same time turning on the forward direction input means transistor 152 and the reverse direction input means transistor 190. This operation allows the direction signal to be applied to turn on the respective start transistor of the desired forward or reverse oscillator control means 182 or 176. Thus, with a forward direction signal applied at input means 55, the direction signal passes through the emitter-collector circuit of transistor 152 and diode 179 to junction 180 and through resistance 181 to the base electrode 226 of start transistor 220 to turn it on and thereby energize forward oscillator 104. In like manner, with a reverse direction signal applied at reverse input means 56, the direction signal passes through the emitter-collector circuit of transistor 190 and diode 212 to the junction 174 and through resistance 175 to the base electrode 244 of start transistor 241 turning it on and thereby energizing reverse oscillator 104'.

Since for normal motoring operation only one oscillator may be energized at a time, means must be provided to assure that once the desired oscillator is energized in response to the applied direction signal the other oscillator is prevented from operating. This is accomplished by applying a signal from the operating oscillator to turn on the lock-out transistor of the other oscillator, thereby keeping it de-energized. That is, when forward oscillator 104 is operating a signal is applied from output winding 126 (FIG. 4) and over conductor 131 to the base electrode 255 of reverse oscillator lock-out transistor 242, thereby keeping reverse oscillator 104' off. Similarly, when reverse oscillator 104' is operating, forward oscillator 104 is kept off by turning on the forward oscillator lock-out transistor 224 by a signal to its base electrode 235 from winding 126' and over conductor 134.

Also, since it is desired to establish a motoring condition, the current is to be regulated at the operating rate, that is, a positive rate-of-change of current takes place. Accordingly, the negative rate-of-change of current reference signal source, potentiometer 61, must be nullified. To this end, a signal from the energized oscillator is applied through resistance 137 and over conductor 138 to turn on transistor 63 which shunts potentiometer 61 thereby nullifying any reference signal therefrom. The rate-of-change of current will then be regulated in accordance with the limit set by potentiometer 60.

To provide for regeneration, means must be provided to allow the applied direction signal to function to start the other direction oscillator and effect the required field reversal at the proper time. This is provided by transistor 264 which is interconnected with transistor 262 so as to be in an opposite conducting state thereto. For example, as indicated in the foregoing description, the no-brake signal turns on transistor 262 which in turn turns off transistor 264. Conversely, in the absence of a no-brake signal, which would be the condition for regeneration, transistor 262 is off and transistor 264 is on. When transistor 264 is on, the direction signal present at input means 55 or 56 is applied to turn on the other direction oscillator.

Thus, with transistor 264 conducting transistor 150 of forward input means 55 is also rendered conducting and the forward direction signal is applied through the emitter-collector circuit of transistor 150 and through diode 173 to the junction 174 and through resistance 175 to the base electrode of reverse oscillator start transistor 241 turning such transistor on to thereby energize the reverse oscillator 104' and allow the reverse pair of controlled rectifiers 38 and 40 to be turned on to reverse the field and connect the motor for regeneration.

The reverse direction signal operates in a similar manner through transistor 192 of the reverse direction input means 56 to such reverse direction signal to start the forward oscillator 104 and allow the forward pair of controlled rectifiers 34 and 36 to become conducting to thereby reverse the field to provide for regeneration. Thus, the reverse direction signal is applied through the emitter-collector circuit of transistor 192 and diode 216 to the junction 180 and through resistance 181 to turn on the forward oscillator start transistor 220.

From the foregoing description it can be seen that logic circiut means 54 allows the desired operating condition to be established when the control system is capable of operation in that condition. Accordingly, assuming a forward direction command signal as well as a no-brake command signal applied to logic circuit means 54, the forward motoring operating condition is established. For example, forward oscillator 104 is energized to supply firing signals to the forward pair of controlled rectifiers 34 and 36 of field circuit means 24. With controlled rectifiers 34 and 36 conducting, current is supplied from the positive output terminal 22 of bridge circuit 14 to terminal 26 of field circuit means 24, through controlled rectifier 34, through field winding 28, (from terminal 32 to terminal 30) and through controlled rectifier 36 and the motor armature circuit back to the bridge circuit 14. Current in field winding 28 in the foregoing described direction from terminal 32 to terminal 30 establishes a direction of rotation referred to herein as the forward direction.

Since, as indicated, potentiometer 61 is shorted out by transistor 63 (FIG. 1) the firing angle of control means 16 will move toward 0° and establish controlled positive rate-of-change of current in accordance with the limit set by the positive rate-of-change of current reference provided by potentiometer 60. Current increases at this rate until it reaches the value established by the current-voltage reference provided by potentiometer 68 and no further increase in current will occur.

The motor accelerates in accordance with the rate of current increase and the motor counter EMF increases until a voltage is reached where the voltage signal from voltage measuring means 76 overrides the signal from current measuring means 80. When this occurs, the motor voltage is regulated to a value corresponding to the reference provided by potentiometer 68.

Since forward controlled rectifiers 34 and 36 are in a conducting state, field detector means 49 produces an output which during the transition between motoring and braking operates to lock-out both the forward and reverse oscillators to allow for the collapse and reversal of the field. In order to allow operation in the motoring condition, however, a pair of controlled rectifiers in field circuit means 24 must be in a conducting state. Accordingly, a signal is applied from the operating oscillator to nullify this field detector signal during the normal motoring operation. Thus, the field detector signal is applied over conductor 384 and through a resistance 240 and a resistance 258 and diode 237 to the base of forward oscillator lock-out transistor 224. With the forward oscillator 104 operating, however, a signal is applied over conductor 132 to the base of transistor 301 turning it on and by-passing the field detector signal through the collector-emitter circuit thereof. Similarly, transistor 302 is rendered conductive to by-pass the field detector signal which would otherwise lock-out reverse oscillator 104' by a signal from such reverse oscillator over conductor 133.

FORWARD REGENERATION

To change from the foregoing forward motoring operation to a regenerative braking operating condition, the no-brake command signal is removed from input means 57 and, if a different braking effort is desired, potentiometer 68 may be moved to provide a different reference value.

With the no-brake signal missing, no-brake input transistor 260 is cut-off which cuts-off transistor 152 of forward input means 55. Also, since transistor 262 is also cut-off with the no-brake signal missing, transistor 264 becomes conductive to turn on transistor 150 of the forward direction input means 55. With transistor 150 turned on, the forward direction signal at input means 55 is applied to the base electrode of the reverse oscillator start transistor 241. Since transistor 152 was cut-off by the lack of a no-brake signal the forward direction signal is no longer applied to forward oscillator start transistor 220 and it turns off, thereby turning off forward oscillator 104 and removing the firing signals from the forward direction pair of controlled rectifiers 34 and 36.

Since oscillator 104 is now inoperative, controlled rectifiers 34 and 36 no longer receive firing signals at their control electrodes. The mere removal of the regenerative gate drive from a controlled rectifier, however, does not cause it to cease conducting so that controlled rectifiers 34 and 36 will continue to conduct. However, since neither forward oscillator 104 or reverse oscillator 104′ are operating, there will be no base drive signal applied to transistor 63 and that transistor therefore turns off to thereby establish the negative rate-of-change of current reference of potentiometer 61.

The presence of the reference provided by potentiometer 61 results in the firing angle of control circuit means 16 moving toward 155° until the current rate corresponding to the reference is established. In the particular arrangement being described, the firing angle moves toward 155° until a current rate of 25 amperes per millisecond is established. The firing angle is under closed-loop control and the current continues to collapse at the foregoing rate.

During the collapse of the current the controlled rectifiers 34 and 36 are, of course, conducting so that field current detector circuit means 49 produces an output signal which is applied over conductors 384 and 386 (FIGS. 5 and 6) to lock-out the reverse oscillator 104′. For example, since forward oscillator 104 is inoperative, no signal will be applied therefrom to the base of transistor 301 and that transistor will thus be turned off to thereby allow the output signal from field current detector 49 to be applied to the base of reverse oscillator lock-out transistor 242 turning such transistor on and keeping reverse oscillator 104′ inoperative.

When the field current reaches zero, field current detector 49 ceases to apply a signal to turn on reverse oscillator lock-out transistor 242 so that such transistor turns off and, because reverse oscillator start transistor 240 is now saturated, reverse oscillator 104′ is energized and causes firing signals to be applied to the control electrodes of the reverse pair of controlled rectifiers 38 and 40. At the same time the firing angle of control circuit means 16 moves toward 0° to establish the regenerative braking current at the rate set by the positive rate-of-change of current reference provided by potentiometer 60. For example, as soon as reverse oscillator 104′ is energized, a signal is applied therefrom to the base of transistor 63 turning it on and thereby nullifying the reference of negative rate-of-change of current reference potentiometer 61 and establishing the positive rate-of-change of current reference of potentiometer 60.

Negative torque is produced causing the motor speed to drop toward zero at a rate corresponding to the braking requirements of the load and the magnitude of the reference signal provided by potentiometer 68. The motor current and voltage are controlled during this regenerative braking mode in the same manner as described in connection with motoring operation. When the motor reaches zero speed the reverse oscillator 104′ may be de-energized in any suitable manner and the motor will remain at rest. Alternatively, if the no-braking signal is present, reverse oscillator 104′ may be kept operative and the motor will continue through zero speed and into reverse motoring operation with the "braking" current set by the reference operating as an accelerating current. All the controls and limits described in connection with motoring operation will, of course, be effective.

It is often convenient in a control system for a vehicle to provide for a signal representing vehicle motion. This motion signal may be applied to the base of transistor 260 as shown by the broken lines in FIG. 5 to keep such transistor on as long as the vehicle is in motion. Accordingly, with such an arrangement, when the vehicle speed reaches zero due to regenerative braking, the motion signal is no longer present and transistor 260 turns off, which in turn causes reverse oscillator lock-out transistor 242 to turn on and thereby cause reverse oscillator 104′ to be de-energized. The vehicle will then remain at rest. Also, when the reverse oscillator 104′ is thus de-energized the negative rate-of-change of current reference is activated—transistor 63 turned off—thereby forcing the motor current to zero in the shortest time and under a controlled rate.

From the foregoing description it may be seen that if the motor is operating in the forward direction and the forward direction signal is removed from forward input means 55, the control system will function as previously described to force the motor and field current to zero at the controlled rate. Since the reverse oscillator 104′ cannot start, however, the motor would be in a coast condition. If before the motor comes to a stop the forward direction signal were to be reapplied, the motor would again operate in forward motoring. If, at the time of reapplication of the forward direction signal, the motor current is not zero, the output signal from field current detector 49 will cause forward oscillator lock-out transistor 224 to be turned on keeping forward oscillator 104 de-energized until such time as the field controlled rectifiers have returned to their forward blocking state. When zero current is reached, field current detector 49 will no longer apply a signal to lock-out transistor 224 and that transistor turns off thereby allowing the reapplied forward direction signal to turn on forward oscillator start transistor 220 and energize forward oscillator 104 to reestablish forward motoring operation.

CONTROL CIRCUIT MEANS 16

(FIGS. 7–13)

The full-wave phase control of a multi-phase controlled rectifier bridge circuit to provide a direct current output voltage which is controllable between maximum values of opposite polarity is well known and various arrangements for providing such control are also known. Accordingly, if desired, any suitable prior art firing circuit may be used with the control system of this invention. Since it has many advantages over the known prior art firing circuits, however, the firing circuit arrangement shown in FIG. 7 is preferred.

For example, the firing circuit arrangement of FIG. 7 is capable of providing for continuous sub-cycle correction of the firing angle, providing for the instantaneous stopping of firing signals in a very simple manner, and providing in a simple manner for the sensing, or monitoring, of the firing angle.

Briefly, the firing circuit arrangement illustrated in FIG. 7 comprises means synchronized with the multi-phase alternating current power supply for generating a linear ramp voltage, means for selecting a particular point on the voltage ramp to determine the firing angle and thereafter disabling the voltage ramp generating means and resetting it to its initial state so that when the particular line-to-line voltage of the A-C power supply is again applied to such voltage ramp generating means a similar voltage ramp will be produced.

In prior art firing circuits for multi-phase bridge circuits with which I am familiar, the six gate firing pulses are fabricated from a single time base. By so doing the leading edges of the firing pulses are conveniently spaced 60 electrical degrees with respect to the time base which time base is then shifted to provide the desired phase angle firing control. In other firing circuit arrangements two time bases have been used, one each half-cycle, and this allows for firing angle correction every 180 electrical degrees.

For many control systems it is desirable to provide for a much faster phase angle firing correction capability. For example, in the regenerative control system of FIG. 1 for controlling the operation of a series direct current motor; especially during control thereof in the regenerative braking operating condition, it is necessary that the firing circuit be capable of rapid firing angle correction. The most rapid firing angle correction possible is every 60 electrical degrees and this requires a separate time base for each of the six firing pulses for the six controlled rectifiers of the bridge circuit 14. These time bases are then suitably shifted in response to an input signal to provide the desired phase-angle firing control.

The complete firing circuit to control bridge circuit 14 comprises three identical sections. In the interest of simplifying the description of the firing circuit, only one of the sections, designated generally by reference numeral 500, will be shown and described in detail. The section 500 includes two portions 501 and 502 each of which is coupled with the alternating current power supply through a common input means including transformer $XT_3$.

As shown in FIG. 7 line to line voltage is supplied to section 500 through transformer $XT_3$, which has its secondary winding 505 connected so that alternate half cycles saturate transistors 508 and 510. When transistor 508 is saturated the regulated DC supply on conductor 511 is applied to the series circuit including resistances 512, 514 and 515, transistor 518, capacitance 520, and diode 522. A voltage reference is provided by resistances 524 and 525 and capacitance 526 and diode 527. This voltage reference is applied to the base of transistor 518 and to the base of a transistor 528 and also to the bases of four other transistors (not shown) in similar positions in the other two portions of the firing circuit. Diode 527 provides temperature compensation considering the emitter base diode of transistor 518.

With the foregoing connection, transistor 518 operates as a constant current regulator, with the value of current set by the previously described voltage reference and the resistor network made up of resistances 512, 514 and 515. The voltage on capacitance 520 thus rises linearly with time and provides a voltage ramp. In one particular arrangement, capacitance 520 and the current regulating arrangement were selected so that the voltage on capacitance 520 reached 15.5 volts at a time corresponding to 155 electrical degrees for the frequency being considered. This may best be understood by reference to FIG. 8 which is a graph showing the firing angle as a function of the voltage $EC_1$ applied to conductors 530 and 531 in FIG. 7. While in the particular arrangement referred to the firing angle was made equal to 10 times the $EC_1$ voltage, it should be understood that this transfer characteristic can be made any other convenient function. Observation of the characteristic of FIG. 8 shows that the firing angle may be readily monitored by simply monitoring, or sensing, the voltage signal $EC_1$.

The input voltage $EC_1$ is applied across conductors 530 and 531. The ramp voltage provided on capacitance 520 is compared with input voltage $EC_1$ through transistor 532 and isolating diode 533. Diode 522 is provided for temperature compensation considering the isolation diode 533 and base to emitter barrier of transistor 532. For better temperature compensation, which would be desireable in an open loop control, diode 532 could be replaced by two diodes in series.

When the voltage on capacitance 520 exceeds the value of voltage $EC_1$ applied to the conductors 530 and 531 of the firing circuit, transistor 532 begins to conduct which turns on a transistor 535 which in turn, through resistance 538, turns on transistor 540. A transformer $X_1$ is provided which, with transistor 540, makes up a one-shot multivibrator with the full control voltage being applied to the primary winding portion 542. Flux in transformer $X_1$ begins to move towards positive saturation and a voltage is induced in winding portion 544 so that terminal 545 is positive with respect to terminal 546. This induced voltage is sufficient to maintain transistor 540 saturated through the feedback circuit including resistances 548 and 549. Resistance 550, capacitances 552 and 553 and diode 555 are used to surpress transistor 540 to preclude spurious triggering from environmental noise. At the same time, a voltage is induced in winding portion 558 of transformer $X_1$ so that the terminal 560 goes positive with respect to the terminal 561.

The voltage induced in winding portion 558 of transformer $X_1$ serves two functions. First, through resistor 570, the gate electrode 572 of controlled rectifier 575 is energized. Second, through resistor 577, transistor 580 is turned on. The turning on of controlled rectifier 575 dumps capacitor 520 to reset it for the next cycle. Transistor 580 applies a voltage to lamp 582 to provide a visual output indication that the controlled rectifier 575 is receiving a firing voltage at its gate electrode 572.

The volt second capacity, the number of turns on winding portion 542 and the input control voltage are all suitably selected so that the transformer $X_1$ requires a time of approximately 90 electrical degrees to reach saturation. When saturation is reached, transistor 540 turns off and the core of transformer $X_1$ is reset to negative saturation by means of reset winding portion 584 and limiting resistance 585. Zener diodes 588 and 589 are connected through isolating diode 590 to the primary winding portion 542 of transformer $X_1$ to clamp the induced voltage of transformer $X_1$ during the resetting thereof.

As indicated previously, it is often desirable that the firing circuit be able to provide for instantaneous stop firing. This is conveniently provided in the arrangement of FIG. 7 by applying a voltage signal, designated ECO, to conductor 592. This voltage is applied through resistance 594 and isolating diode 596 to the gate electrode 572 of controlled rectifier 575. The voltage signal ECO is also applied through corresponding resistors and diodes to controlled rectifier 598 and to four other corresponding controlled rectifiers in the other two similar sections (not shown) of the complete firing circuit. Accordingly, when the voltage signal ECO is applied to conductor 592, continuous gate drive is applied to the controlled rectifiers 575 and 598 in each of the three sections of the firing circuit and such controlled rectifiers are turned on to prevent the charging of capacitances 520 thereof to any value sufficient to initiate operation of the one-shot multivibrator comprised of transistor 540 and transformer $X_1$. Thus, a very simple and effective stop-firing capability has been provided.

Under operating conditions certain firing angles may cause a jitter, or instability, in the output regulated quantity of the firing circuit. This instability is found to be caused by the distortion of line to line voltage when the controlled rectifiers of bridge circuit 14 are fired being reflected back through adjacent phases in the transformer XT3 to the firing circuit. This causes jitter in the zero angle timing point. This instability is corrected in the arrangement of FIG. 7 by the use of a 60 cycle resonant circuit comprised of capacitance 600 and inductance 602 in series with the second winding 505 of transformer XT3. This series resonant circuit allows only the fundamental current to flow through the transistors 508 and 510 and thus eliminates this problem. Only one such series resonant circuit is required for each section of the firing circuit since each such resonant circuit serves the both portions 501 and 502.

Because of the transfer characteristic of the arrangement of FIG. 7, simply monitoring the EC voltage through a conventional voltage reference, such as a Zener diode, provides a very simple means of providing speed regulation in a drive subjected to overhauling loads. For example, when the firing angle exceeds 90°, (i.e., EC voltage exceeds a preselected value say 9 volts), the Zener current is utilized to saturate a transistor and remove the no brake voltage from the logic circuit input. This sets the system up for negative torque, as shown in FIG. 2, and the speed is regulated by regenerative braking. When a positive torque load is reapplied to the system, the speed attempts to drop and the firing angle will move towards zero. As the firing angle drops below 90°, (i.e., EC voltage drops below the preselected value), the sensing circuit reestablished the no brake signal and sets the system up for the motoring, or positive torque, mode of operation.

The winding portion 604 of the output transformer XI of section 500 has a voltage induced in its as shown in FIG. 9. The induced voltage pulse going positive is made to persist for approximately 90°. The length of this pulse is not critical and variations of ±5° bear no consequence for practical circuit operation. This voltage pulse is used to provide gate drive for a particular one of the controlled rectifiers in the power conversion bridge circuit 14 so that the complete firing circuit is operative to control conduction in the controlled rectifier paths in repetitively sequential cycles.

Due to the $dI/dt$ limitation on power controlled rectifiers, hard firing techniques must be employed. This requires that the gate voltage be applied to the controlled rectifier in less than one microsecond and that the peak current at the instant of initial turn on be 2 to 3 times the steady current required to keep the controlled rectifier turned on. This requires that the pulse shown in FIG. 9 be suitably shaped to meet the foregoing criteria. To avoid the problems associated with transmitting currents in the order of amperes through extensive lengths of wire, a pulse forming circuit 610 shown in FIG. 10 is employed and is physically located as near as possible to the controlled rectifiers of bridge circuit 14.

As shown in FIG. 10, pulse forming circuit 610 comprises a capacitance 612 which charges from the positive voltage shown in FIG. 9 through diode 614 to a value sufficient to fire a Shockley Diode 616 at this instant, the Shockley Diode 616 turns on and this voltage is applied through capacitance 618, Shockley Diode 616, and Resistor 620 to the gate of the associated controlled rectifier of bridge circuit 14. FIG. 11 shows this gate current pulse. The initial portion of the pulse is set by resistance 620 with the steady state value thereof being set by resistances 624 in parallel with 626 and in series with 620. This network is particularly adaptable to the type of output voltage provided by the output transformers of the firing circuit shown in FIG. 7 and assures that adequate hard firing is provided for the power conversion controlled rectifiers of bridge circuit 14.

FEEDBACK CIRCUITRY
(FIG. 12)

A suitable feedback circuit arrangement for combination with the firing circuit of FIG. 7 is shown in FIG. 12. A transistor 630 controls the flow of current through a diode 632 and a limiting resistance 634 to a capacitance 636 to provide a ramp voltage on conductor 637 designated $EC_2$. The $EC_2$ voltage is also applied through a diode 638 to a capacitance 640 to provide the voltage $EC_1$ on conductor 530 which connects with conductor 530 in FIG. 7. The arrangement of an $EC_1$ storage capacitor and an $EC_2$ storage capacitor allows for smooth integration of input phase shifting information by the $EC_2$ capacitor with fast response of $EC_2$ voltage on the $EC_2$ capacitor, which is much smaller in value, when such fast response is required.

Transistor 630 can be turned on by either transistor 644, 646, 648, or 650 each of which is associated with a particular system parameter. The operation during current limiting mode can be understood as follows. A reference voltage is set across resistor 652 which turns transistors 644 and 630 off to allow for the $EC_1$ voltage to decrease thereby shifting the firing angle towards zero, corresponding to zero $EC_1$ volts. When the current feedback voltage, designated CMC, on conductor 654 exceeds the reference voltage value, transistor 644 is turned on through resistances 656 and 657 and this in turn turns on transistor 630 to raise the $EC_1$ voltage and thereby shift phase towards 155°. This feedback arrangement operates identically for both motoring and regenerative braking except that the firing angle operates between 90° and 155° for braking and between 0° and 90° for motoring.

The voltage feedback arrangement functions in like manner using transistor 646 to drive transistor 630 except that in this mode of operation a fixed voltage reference is set by the resistors 660 and 662.

To allow for a lower reference to provide a lower voltage limit in regenerative braking than is used in motoring, means are provided to selectively shunt resistance 662 with additional resistance. This is very conveniently provided, as shown in the stabilizing circuit arrangement illustrated in FIG. 13, by causing resistance 662 to be shunted by transistor 664 and a resistance network including resistances 666, 668, and 690 and potentiometer 692.

Transistor 64 receives its turn on drive in the following manner. The $EC_1$ voltage of the firing circuit shown in FIG. 7 is applied through resistor 694 and Zener diode 696 to the base of transistor 664. Since this lower regenerative braking voltage limit occurs only for firing angles greater than 90°, by selecting Zener diode 696 to have a breakover voltage greater than the preselected $EC_1$ voltage corresponding to 90°, the voltage reference is automatically recalibrated for regenerative braking.

Referring again to FIG. 12, a transistor 700 is provided which compares a voltage reference with the voltage drop across six diodes, indicated generally at 702, one located in each of the heat sinks of the controlled rectifiers of bridge circuit 14 so that their temperatures very closely approximate the case temperature of the controlled rectifiers. A resistor 704 sets a bias current value on these diodes. The barrier voltage of each such diode decreases approximately 1 millivolt for each degree F. increase in temperature. With the foregoing arrangement, the average temperature of the six power conversion controlled rectifiers is continuously monitored and compared with a preset reference. Should this average temperature exceed the preset safe value, transistor 700 turns on which turns on transistor 644 and applies gate drive to controlled rectifier 710 turning it on and energizing lamp 711 to indicate an over temperature condition. Controlled rectifier 710 in addition to providing power for the over temperature indicator lamp 711 provides a drive to transistor 648 through diode 712 and resistance 714. Transistor 648 normally functions to receive rate of change of voltage and rate of change of current signals. When transistor 648 is saturated, however, it turns on transistor 630 and sets the firing angle at 155° to shut down the system due to over temperature.

As further shown in FIG. 12, a transistor 714 is provided which receives a plurality of inputs, namely, (1) a signal indicating instantaneous armature current, which is measured by Zener diode 716, (2) a signal indicating unbalance between the field and armature currents and (3) a signal indicating phase load unbalance. Any or all of these signals operate to saturate transistor 714 thereby turning on a transistor 718 and firing controlled rectifier 720 which very quickly raises the $EC_1$ voltage, through resistance 722, to the maximum phase angle condition. Conduction in controlled rectifier 720 also turns on a transistor 724 which in turn cuts off a transistor 726 to allow transistor 650 to set the $EC_2$ voltage through transistor 630 at its maximum value. This is done to make certain that the beginning of reapplication of power to the drive system always occurs from the maximum EC voltage value and hence maximum phase angle position.

Controlled rectifier 720 also provides a charging current to the emitter capacitance 730 to a unijunction transistor 732 through resistor 734 and diode 736. The output pulse from unijunction transistor 732 fires controlled rectifier 740 which turns off controlled rectifier 720 after approximately one second in an attempt to restore normal operation to the system. If any of the fault conditions still exist, controlled rectifier 720 will again fire and unijunction transistor 732 will again produce a pulse. The number of times that controlled rectifier 720 fires is counted by a second unijunction transistor 744 through storage capacitor 745 and charging resistance 748 and isolating diode 750. After approximately 10 attempts to restore normal operation, unijunction transistor 744 fires controlled rectifier 752 which permanently locks the system in the maximum phase angle condition and an indicator light 754 indicates a phase back and short field condition. Both controlled rectifiers 720 and 752 function to energize conductor 758 which in turn connects with logic circuit means 54 to energize both oscillators 104 and 104' to create the short field condition previously described.

STABILIZING

(FIG. 13)

In FIG. 13 there is shown a circuit arrangement for providing the required stabilizing of system operation plus sensing circuitry to either recalibrate or initiate corrective action should certain fault conditions exist. As shown, rate transformer 64 is provided with secondary drive transistors 760 and 764. The polarity of the output of rate transformer 64 is such that an increase in current causes terminal 766 to go positive with respect to terminal 768. The AC voltage ever present on the rate transformer output due to the ripple current associated with controlled rectifier control drive arrangements creates certain stability problems. In many systems, the rate transformer output is merely filtered to eliminate this undesirable ripple voltage. However, the response requirement dictated by the series field arrangement of the series direct current motor precluded this conventional approach.

In the arrangement of FIG. 13 constant current discharge arrangement is provided by a transformer 780 having a constant base drive voltage reference set by resistance voltage divider including resistances 782 and 784 and compensating diode 785 and an emitter resistance network including resistances 788, 790 and 800. This constant current discharge is activated when transistor 760 is on and this occurs when terminal 768 of rate transformer 64 is positive with respect to terminal 766. The current path for this rate transformer signal is through a transistor 802, which is saturated by a transistor 804 and the signals on conductor 806 coming from the oscillator circuits 104 and 104' indicating that the system is operating in either motoring or braking, and through diodes 808 and 810 to the emitter of transistor 760 out of the base of transistor 760 to terminal 766 of the rate transformer 64.

When the DC level of current is not changing, the circuit is arranged so that the ripple voltage due to the ripple current will keep transistor 760 on 50% of the time and transistor 764 on 50% of the time. Also, transistor 764 activates a constant current charging circuit that provides constant current to the $EC_2$ capacitance 636 (FIG. 12). Accordingly, when no change occurs in the DC current, current is removed from the $EC_2$ capacitance 636 50% of the time and the same current is returned to capacitance 636 50% of the time. However, as the DC level of current increases, an average DC voltage of a polarity with terminal 766 with respect to terminal 768 occurs on the rate transformer output and the transistor 764 remains saturated more than 50% of the time compared with transistor 760. Therefore, the constant current to the EC capacitance exist a larger percentage of time than a constant current away from the EC capacitance. The exact situation exists under a negative rate of change of current in the transformer except now transistor 760 is saturated over 50% of the time compared to transistor 764. Note that when neither field firing oscillator 104 or 104' is energized, the rate of change of current should be regulated at the 25 ampere per millisecond rate. Under this condition transistor 802 is no longer saturated and the rate transformer output rises to a value corresponding to 25 amperes per millisecond which causes zener diode 816 to breakover which turns on transistor 760 to limit the rate of change of current to this value. The logic circuit means 54 receives a signal on conductors 818 and 820 through resistors 822 and 824 that keep both oscillators locked out until the rate transformer current has fully collapsed and transistor 760 can again turn off. This is required due to certain ripple current conditions which could allow the field current to go to zero prior to a complete collapse of armature current.

Although in accordance with the patent statutes this invention is described as embodied in concrete form and the principle thereof has been explained together with the best mode in which it is now contemplated applying that principle, it will be undestood that the apparatus shown and described is merely illustrative and that the invention is not limited thereto, since changes and modifications will readily occur to persons skilled in the art without departing from the true spirit and scope of the appended claims.

What I claim as new and desire to secure by Letters Patent of the United States is:

1. In a system for controlling a direct current motor having field and armature circuits between motoring and regenerative braking operations from an alternating current power supply, the combination comprising:

(a) power conversion means for developing a controllable direct current output from said alternating current power supply, said power conversion means comprising a plurality of controlled rectifiers and a phase-control firing circuit means operatively connected with said controlled rectifiers to provide for the transfer of energy from said power supply during motoring and to said power supply during regenerative braking;

(b) field circuit means including controlled rectifier means selectively controllable to provide for opposite directions of current flow through the motor field circuit;

(c) means connecting the armature circuit of said motor in a series circuit loop with said power conversion means and said field circuit means so that said armature circuit is energized from said power supply during motoring and supplies energy to said power supply during regenerative braking;

(d) logic circuit means connected with said phase-control firing circuit means and said field circuit means and responsive to electrical signals representing a desired motor operating condition, such as forward or reverse motoring or regenerative braking, for allowing the desired motor operating condition to be established if the control system is capable of operation in that condition;

(e) one or more means one associated with each of a selected number of system parameters for producing error signals representing an actual value of such system parameter which differs from a desired value of such parameter;

(f) means applying said error signals to the phase-control firing circuit means of said power conversion means with said error signals being operable to influence the net phase-shift of the firing pulses produced by said firing circuit means, said power conversion means being operable in accordance with said error signals and a first direction of current flow through the motor field circuit for energizing the armature circuit of said motor from said power supply during motoring and in accordance with said error signals and the reverse direction of current flow through said motor field circuit for supplying energy from the motor armature circuit to said power supply during regenerative braking.

2. The system recited in claim 1 including means operatively associated with said field circuit means for preventing the controlled rectifier means thereof being controlled to provide for current flow in one direction in said motor field circuit unless current flow therethrough in the other direction has ceased.

3. The system recited in claim 2 wherein said means for preventing control of said controlled rectifier means includes a sensing means operative to sense the conductivity condition of the controlled rectifiers of said controlled rectifier means of said field circuit means.

4. The system recited in claim 1 wherein said controlled rectifier means of said field circuit means comprises first and second pairs of controlled rectifiers arranged so that current conduction through said first pair is operative to establish one direction of current flow in the motor field circuit and current conduction through the second pair is operative to establish the reverse direction of current flow in the motor field circuit.

5. The system recited in claim 4 including means for sensing current conduction in said controlled rectifiers and being operative to prevent the initiation of conduction in a desired pair of controlled rectifiers unless all controlled rectifiers are in their forward blocking states.

6. The system recited in claim 5 wherein said sensing means operative to sense current conduction in the controlled rectifiers of said field circuit means comprises:

(a) transformer means having a primary winding connectable with an alternating current source and two center-tapped secondary windings connected with said controlled rectifiers through respective series combinations of a resistance and a diode so that during one half cycle of said alternating current source a voltage in the forward conducting direction is applied to one pair of controlled rectifiers and during the other half cycle a voltage in the forward conducting direction is applied to the other pair of controlled rectifiers; and (b) output means connected with the primary circuit of said transformer means, said output means being energized whenever current flows in the secondary circuit of said transformer means.

7. The system recited in claim 1 wherein one of said means for producing error signals is a circuit means for producing an error signal representing the difference between a desired and the actual value of the rate of change of motor armature current.

8. The system recited in claim 7 wherein said circuit means includes a rate transformer connected to sense the rate of change of motor armature current.

9. The system recited in claim 1 including a system fault detection and correction means comprising means responsive to a preselected peak value of motor current for causing the motor field circuit to be shorted and the power supplied to said motor to be cut off.

10. The system recited in claim 9 including timing circuit means for reestablishing the system operating condition by removing the short from said field circuit and reapplying power to said motor, said timing circuit means being operative to reestablish such operating condition only a preselected number of times in the presence of the preselected peak value of motor current.

11. The system recited in claim 1 including motor voltage reference means operable during regenerative braking operation to limit the regenerative braking voltage to a predetermined value.

12. The system recited in claim 7 including means for selecting one rate-of-change of motor current reference during motoring and regenerative braking operation and a different rate-of-change of motor current reference during the transition from motoring to regenerative braking.

13. In a control system for an electric motor having a field and an armature circuit and which motor is supplied from an alternating current power supply source to provide for regulation of the motor operating condition between motoring and regenerative braking, the combination comprising:

(a) power conversion means adapted to have its input connected with an alternating current power supply source for providing a direct current output which may be varied from a maximum value of one polarity to a maximum value of the opposite polarity;

(b) a field circuit reversing means including controlled rectifier means adapted to be selectively rendered conductive to route current in one direction or the other through a motor field winding connected therewith;

(c) means connecting said power conversion means, said field circuit means and the armature circuit of said electric motor in a series circuit loop;

(d) field current detector means operative to produce an output signal unless the controlled rectifier means of said field circuit reversing means are in a forward blocking state;

(e) firing circuit means operative to selectively apply firing signals to said controlled rectifier means;

(f) means responsive to the output signal from said field current detector means for preventing the application of said firing signals to said controlled rectifier means; and (g) means responsive to operation of said firing circuit means for nullifying said last mentioned means to thereby allow the system to commence and continue in operation.

14. A regenerative direct current motor control system for regulating the operation of a series direct current motor from an alternating current power supply source between motoring and regenerative braking conditions comprising:

(a) a power conversion means connectable with an alternating current power supply source and being controllable in response to system feed-back signals to provide a direct current output which may be varied from a maximum value of one polarity to a maximum value of the opposite polarity;

(b) field circuit means including two pairs of controlled rectifiers, said field circuit means being connectable with the field circuit of said direct current motor so that said pairs of controlled rectifiers may be selectively operated to route current through said motor field circuit in one direction or the other to establish a desired direction of motoring and regeneration;

(c) means interconnecting said field circuit means and the motor armature circuit in series circuit relationship with the direct current output of said power conversion means;

(d) firing circuit means for said field circuit means operable in response to electrical signals representing a desired direction of motor rotation to render a selected pair of controlled rectifiers conducting to establish current flow in the motor field circuit in one direction and for rendering the other pair of controlled rectifiers conducting to reverse the direction of motor field current to establish regeneration.

15. The regenerative direct current motor control system recited in claim 14 including means for controlling the rate of change of motor current.

16. The regenerative direct current motor control system recited in claim 15 wherein said rate of change of motor current is regulated at one rate during motoring and regenerative braking and at a different rate during the transition from a motoring to a regenerative braking condition.

17. The regenerative direct current motor control system recited in claim 14 including means for establishing maximum motor current and voltage operating limits.

18. In a control system for a direct current motor having a winding which determines the direction of motor rotation and regenerative braking in accordance with the direction of current in such winding, the combination comprising:
    (a) power conversion means connectable with an alternating current power supply source and producing a controllable direct current output which may be varied between a maximum value of one polarity and a maximum value of the opposite polarity;
    (b) a controlled rectifier bridge circuit having opposed input means connected with said power conversion means to be supplied with direct current therefrom, said motor winding being adapted to be connected across opposed output means of said bridge circuit so that selective conductivity of pairs of said controlled rectifiers is operative to route said direct current in one direction or the other in said winding;
    (c) means for controlling said power conversion means to provide for one maximum rate-of-change of motor current during motoring and regenerative braking operation and a higher maximum rate-of-change of motor current during the transition from motoring to regenerative braking;
    (d) and means for controlling said power conversion means to provide for preselected motor current and voltage limits.

19. The control system recited in claim 18 wherein the winding adapted to be connected across the opposed output means of said controlled rectifier bridge circuit is the field circuit winding of said direct current motor.

20. The control system recited in claim 19 wherein the winding adapted to be connected across the opposed output means of said controlled rectifier bridge circuit is the armature circuit winding of said direct current motor.

21. The control system recited in claim 18 including means to establish a different maximum voltage limit for operation during regenerative braking than for operation during motoring.

22. The control system recited in claim 18 including means for preventing transition between motoring and regenerative braking unless the controlled rectifiers of said controlled rectifier bridge circuit are in forward blocking states.

23. The control system recited in claim 19 wherein said direct current motor is a series motor 24. The control system recited in claim 20 wherein said direct current motor is a shunt motor and means are included for separately exciting the field circuit thereof.

25. A control system for regulating the operation of a series-field direct current motor from an alternating current power supply comprising:
    (a) a bridge rectifier converter including six controlled rectifiers and connectable with an alternating current power supply to control the current supplied to said direct current motor, said converter including a control means operative to allow the output of said converter to be varied from a maximum value of one polarity to a maximum value of the opposite polarity;
    (b) means responsive to motor armature current for producing a first signal voltage;
    (c) means responsive to motor armature voltage for producing a second signal voltage;
    (d) a first source of reference voltage;
    (e) means for producing a signal voltage representing the difference of said reference voltage and said first and second signal voltages for causing said control means to control the output of said converter to regulate the motor armature current and voltage within preselected maximum limits;
    (f) field circuit means including first and second pairs of controlled rectifiers, said field circuit means having operatively associated therewith a firing circuit means for producing continuous gate drive signals for selectively controlling said first and second pairs of controlled rectifiers to provide for the establishment of opposite directions of current flow in the motor field winding;
    (g) means for detecting the conducting state of the controlled rectifiers of said field circuit means and being operative to produce a third signal voltage whenever any of said controlled rectifiers of said field circuit means are in a conducting state;
    (h) means responsive to motor armature current for producing a fourth signal voltage representing the rate-of-change of said armature current;
    (i) a second and a third source of reference voltage, said third source of reference voltage being nullified whenever said firing circuit means is in operation;
    (j) means for comparing said fourth signal voltage with said second reference to produce a fifth signal voltage;
    (k) means for comparing said fourth signal voltage with said third reference voltage to produce a sixth signal voltage;
    (l) means applying said fifth and sixth signal voltages to said control means to control the output of said converter to regulate one rate-of-change of motor armature current during motoring and regenerative braking operating conditions and another rate-of-change of motor armature current during the collapse of the inductive stored energy in the motor field prior to the change in operating condition of the motor; and
    (m) logic circuit means responsive to said third signal voltage, a signal indicating operation of said firing circuit means, and signal voltages representing a desired motor operating condition for allowing that operating condition to be established if the control system is capable of operation in that condition.

References Cited

UNITED STATES PATENTS

| | | | |
|---|---|---|---|
| 1,933,231 | 10/1933 | Stevens | 318—376 |
| 3,297,930 | 1/1967 | Payne | 318—251 |
| 3,325,714 | 6/1967 | Torii | 318—376 |
| 3,484,676 | 12/1969 | Wilkerson | 318—300 |

ORIS L. RADER, Primary Sxaminer

K. L. CROSSON, Assistant Examiner

U.S. Cl. X.R.

318—258, 300, 302, 376